(12) United States Patent
Ruedinger et al.

(10) Patent No.: US 12,242,924 B2
(45) Date of Patent: Mar. 4, 2025

(54) MAPPING CONDITIONAL EXECUTION LOGIC TO QUANTUM COMPUTING RESOURCES

(71) Applicant: International Business Machines Corporation, Armonk, NY (US)

(72) Inventors: Jeffrey Joseph Ruedinger, Rochester, MN (US); Thomas Arab Alexander, Tarrytown, NY (US); David C. Mckay, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1147 days.

(21) Appl. No.: 17/018,507

(22) Filed: Sep. 11, 2020

(65) Prior Publication Data
US 2022/0083888 A1   Mar. 17, 2022

(51) Int. Cl.
*G06N 10/00* (2022.01)
*G06F 8/41* (2018.01)
(Continued)

(52) U.S. Cl.
CPC .............. *G06N 10/00* (2019.01); *G06F 8/447* (2013.01); *G06F 9/5027* (2013.01); *G06N 10/40* (2022.01)

(58) Field of Classification Search
CPC ........ G06N 10/00; G06N 10/40; G06N 10/20; G06N 10/80; G06F 8/447; G06F 9/5027; G06F 8/451; G06F 8/60
See application file for complete search history.

(56) References Cited

U.S. PATENT DOCUMENTS 9,218,567 B2   12/2015   Macready et al.
9,645,604 B1    5/2017   Nebesnyi
(Continued)

FOREIGN PATENT DOCUMENTS

EP    2729903 A1    5/2014
JP   2021-504829 A  2/2021
(Continued)

OTHER PUBLICATIONS

Ryan et al. "Hardware for dynamic quantum computing". 1997. AIP Publishing. 22 pages. https://pubs.aip.org/aip/rsi/article/88/10/104703/836456 (Year: 1997).*

(Continued)

*Primary Examiner* — Maikhanh Nguyen
(74) *Attorney, Agent, or Firm* — Amin, Turocy & Watson, LLP

(57) ABSTRACT

Systems, computer-implemented methods, and computer program products to facilitate mapping conditional execution logic to different quantum computing resources are provided. According to an embodiment, a system can comprise a memory that stores computer executable components and a processor that executes the computer executable components stored in the memory. The computer executable components can comprise a compiler component that maps a logical reference to a quantum bit data structure in an instruction, to a first engine component, and a deployment component that deploys the first engine component to a first block controller component operatively connected to a first quantum computing resource, wherein the first engine component controls the first quantum computing resource based on the instruction.

18 Claims, 15 Drawing Sheets

(51) Int. Cl.
  *G06F 9/50* (2006.01)
  *G06N 10/40* (2022.01)

(56) References Cited

U.S. PATENT DOCUMENTS

| | | | |
|---|---|---|---|
| 9,876,505 | B1 | 1/2018 | Dai et al. |
| 10,505,524 | B1 | 12/2019 | Cohen et al. |
| 10,536,224 | B1 | 1/2020 | Nation et al. |
| 10,546,244 | B2 | 1/2020 | Bishop et al. |
| 10,552,756 | B2 | 2/2020 | Ipek et al. |
| 10,560,076 | B1 | 2/2020 | Cohen et al. |
| 10,635,990 | B1 | 4/2020 | Park et al. |
| 11,210,602 | B2 | 12/2021 | Biercuk et al. |
| 2005/0015422 | A1* | 1/2005 | Kohn ............... G06N 10/00 708/446 |
| 2005/0044344 | A1* | 2/2005 | Stevens ............ G06F 15/7867 712/227 |
| 2013/0198740 | A1 | 8/2013 | Arroyo et al. |
| 2014/0026108 | A1* | 1/2014 | Bocharov ......... G06N 10/00 716/102 |
| 2015/0026494 | A1 | 1/2015 | Bainbridge et al. |
| 2015/0205759 | A1* | 7/2015 | Israel ............... G06N 10/00 703/2 |
| 2015/0324705 | A1 | 11/2015 | Biercuk et al. |
| 2016/0218867 | A1 | 7/2016 | Nordholt et al. |
| 2016/0267032 | A1* | 9/2016 | Rigetti ............. G06F 13/4068 |
| 2016/0328211 | A1 | 11/2016 | Nordholt et al. |
| 2017/0177534 | A1 | 6/2017 | Mohseni et al. |
| 2018/0276556 | A1* | 9/2018 | Garrison .......... G06N 5/01 |
| 2019/0042392 | A1* | 2/2019 | Matsuura ......... G06N 10/00 |
| 2019/0042965 | A1 | 2/2019 | Clarke et al. |
| 2019/0042970 | A1 | 2/2019 | Zou et al. |
| 2019/0042973 | A1 | 2/2019 | Zou et al. |
| 2019/0251478 | A1 | 8/2019 | Bishop et al. |
| 2019/0362270 | A1 | 11/2019 | Haener et al. |
| 2020/0116784 | A1 | 4/2020 | Liu et al. |
| 2020/0125402 | A1 | 4/2020 | Griffin et al. |
| 2020/0349458 | A1 | 11/2020 | Cohen et al. |
| 2020/0358536 | A1 | 11/2020 | Griffin et al. |
| 2021/0042650 | A1 | 2/2021 | Das et al. |
| 2021/0279625 | A1* | 9/2021 | Shani .............. G06F 12/0238 |
| 2021/0334081 | A1 | 10/2021 | Chong et al. |
| 2022/0156628 | A1 | 5/2022 | Kim et al. |
| 2023/0145090 | A1* | 5/2023 | Bishop ............. G06F 7/588 703/14 |

FOREIGN PATENT DOCUMENTS

| | | |
|---|---|---|
| JP | 2022-500776 A | 1/2022 |
| WO | 2013/006836 A1 | 1/2013 |
| WO | 2020056176 A1 | 3/2020 |
| WO | 2020109869 A2 | 6/2020 |

OTHER PUBLICATIONS

Non-Final Office Action received for U.S. Appl. No. 17/018,531 dated Jan. 21, 2022, 25 pages.
International Search Report and Written Opinion received for PCT Application Serial No. PCT/EP2021/074830 dated Jan. 14, 2022, 11 pages.
International Search Report and Written Opinion received for PCT Application Serial No. PCT/EP2021/074829 dated Dec. 22, 2021, 15 pages.
Guerreschi et al. "Two-step approach to scheduling quantum circuits", arXiv:1708.00023v2 [quant-ph], XP081150149, May 16, 2018, 25 pages.
Tarjan, Paul "Online YAML Parser" http://yaml-online-parser.appspot.com/, Last Accessed Aug. 24, 2020. 1 page.
Qiskit "Development Strategy" Qiskit Development Team,. https://qiskit.org/documentation/development_strategy.html, Last Accessed Aug. 24, 2020. 9 pages.
Ben-Kiki "YPaste—Online YAML Reference Parser" ben-kiki.org/oren/2016/02/26/ypaste.html, Last Accessed Aug. 24, 2020, 1 page.
Databytzal, "Learn YAML in five minutes!" Code Project, https://www.codeproject.com/Articles/1214409/Learn-YAML-in-five-minutes, Dec. 28, 2017. 7 pages.
"YAML 1.2" https://yaml.org/, Last Accessed, Aug. 24, 2020, 3 pages.
Yehan, Liu "Quantum Feedback Control of Multiple Superconducting Qubits" Yale University, Dec. 2016, 181 pages.
Steiger et al. "ProjectQ: An Open Source Software Framework for Quantum Computing" arXiv:1612.08091v1 [quant-ph] Dec. 23, 2016, 11 pages.
Mell, Peter, et al. "The NIST Definition of Cloud Computing." National Institute of Standards and Technology. Sep. 2011. 7 pages.
McKay et al., "Qiskit Backend Specifications for OpenQASM and OpenPulse Experiments," arXiv:1809.03452 [quant-ph, Sep. 11, 2018, 68 pages.
Alexander et al., "Qiskit Pulse: Programming Quantum Computers through the Clouds with Pulses," arXiv:2004.06755 [quant-ph], Apr. 14, 2020, 16 pages.
McClure, "Programming Quantum Computers with Qiskit," WiSQCE, Jan. 2020, 49 pages.
Reply dated Oct. 30, 2023 In response to the communication pursuant to Rules 161(1) and 162 EPC dated Apr. 20, 2023 for EP Application No. EP21773604.0.
Examination Report No. 1 received for Australian Patent Application Serial No. 2021341467 dated Jun. 13, 2023, 3 pages.
International Search Report and Written Opinion received for PCT Application Serial No. PCT/EP2021/074825 dated Dec. 2, 2021, 12 pages.
Versluis et al., "Quantum computers scale up: Constructing a universal quantum computer with a large number of qubits will be hard but not impossible", IEEE Spectrum, XP011781542, vol. 57, No. 4, Apr. 1, 2020, pp. 24-29.
Calderaro et al., "Fast and simple qubit-based synchronization for quantum key distribution", arxiv.org, Cornell University Library, 201 Olin Library Cornell University Ithaca, NY 14853, XP081483617, Sep. 26, 2019, 7 pages.
Non Final Office Action received for U.S. Appl. No. 17/018,480, dated Dec. 21, 2023, 48 pages.
Notice of Allowance for U.S. Appl. No. 17/018,480 dated Jul. 3, 2024.
Japanese Patent Office "Notice of Reasons for Refusal" Dec. 4, 2024, 3 pages, Japanese Patent Application No. 2023-516080.
Japanese Patent Office "Notice of Reasons for Refusal" Dec. 9, 2024, Japanese Patent Application 2023-507483, 9 pages.

* cited by examiner

703

Function Select 782
fsel[2:0] =
000, F0 = constant 0
001, F1 = constant 1
010, F2 = OR of masked inputs
011, F3 = 1 when pattern matches
100, F4 = 1 when pattern does not match
101, F5 = reserved (constant 0)
110, F6 = reserved (constant 0)
111, F7 = reserved (constant 0)

Pass Through (input to output):
Use 'mask' with 1 bit set and 'OR'

| | |
|---|---|
| ─▶ h000 | Hardware control field 774 |
| ─▶ h001 | Hardware control field 774 |
| ─▶ h002 | Hardware control field 774 |
| ─▶ h003 | Hardware control field 774 |
| ─▶ h004 | Hardware control field 774 |
| ─▶ h005 | |
| ... | |
| ─▶ (last) | Hardware control field(s) |

LIST 777 brackets h000–h004

| NUMBER OF CYCLES 772 | INSTRUCTION SEQUENCER ENTRIES 773 |
|---|---|
| 5 | Hardware control fields 774 |
| 100 | Hardware control fields |
| ... | ... |
| 0 | Hardware control fields 776 |

COMPRESSED 778

MAPPING CONDITIONAL EXECUTION LOGIC TO QUANTUM COMPUTING RESOURCES

BACKGROUND

The subject disclosure relates to using quantum computing resources, and more specifically, to mapping conditional execution logic to different quantum computing resources.

Some existing quantum computing development technologies allow a developer to use simple operators to develop and implement applications for a quantum computing resource. A problem with such existing development technologies is that it is challenging, not only to develop an application for a particular quantum computing resource, but also to reuse the development efforts for other quantum computing resources. Such challenges can arise because implementations of different quantum backend computing resources may dramatically differ in their structure, the availability of commands, the communication latency between different components, and the availability of program resources, e.g., registers. Because applications with conditional execution aspects rely upon the storage and relay of information within a particular quantum computing resource, these applications can be especially difficult to migrate to different resources.

Given the challenges described above, a problem with such existing quantum computing development technologies is that they can involve complex and time-consuming adaption of applications for particular quantum backend computing resources, e.g., by requiring a unique compiler for each instance of an application.

SUMMARY

The following presents a summary to provide a basic understanding of one or more embodiments of the invention. This summary is not intended to identify key or critical elements, nor delineate any scope of the particular embodiments or any scope of the claims. Its sole purpose is to present concepts in a simplified form as a prelude to the more detailed description that is presented later. In one or more embodiments described herein, systems, devices, computer-implemented methods, and computer program products that facilitate mapping conditional execution logic to quantum computing resources are described.

According to an embodiment, a system can comprise a memory that stores computer executable components and a processor that executes the computer executable components stored in the memory. The computer executable components can comprise a compiler component that can map a logical reference to a quantum bit data structure in an instruction, to a first engine component, and a deployment component that can deploy the first engine component to a first block controller component operatively connected to a first quantum computing resource, with the first engine component controlling the first quantum computing resource based on the instruction. An advantage of such a system is that it can enable a mapping system for quantum computing applications to more quickly and more efficiently develop and deploy applications on one or more quantum computing resources.

According to another embodiment, the compiler component of the system can further map the logical reference of the instruction to a third engine component operatively coupled to a third quantum bit of a second quantum computing resource, with the first quantum computing resource and the second quantum computing resource being quantum computing devices with different structures. An advantage of such a system is that it can enable a quantum state measurement backend system to more quickly and more efficiently identify a greater quantity of quantum backend computing resources that can capture a quantum state measurement based on one or more entity defined criteria. An advantage of such a system is that it can enable a mapping system for quantum computing applications to more quickly and more efficiently develop and deploy applications on one or more quantum computing resources.

According to another embodiment, a computer-implemented method can comprise mapping, by a system operatively coupled to a processor, a logical reference to a quantum bit data structure in an instruction, to a first engine component. An advantage of such a system is that it can enable a mapping system for quantum computing applications to more quickly and more efficiently develop and deploy applications on one or more quantum computing resources.

In some embodiments, the above computer-implemented method can further comprise deploying, by the system, the first engine component to a first block controller component operatively connected to a first quantum computing resource. In one or more embodiments, the first engine component can control the first quantum computing resource based on the instruction. An advantage of such a system is that it can enable a mapping system for quantum computing applications to more quickly and more efficiently develop and deploy applications on one or more quantum computing resources.

In some embodiments, the above computer-implemented method can further comprise deploying, by the system, a second engine component to a second block controller component operatively connected to a second quantum bit of the first quantum computing resource and the first block controller component, with the second engine component controlling the first quantum computing resource based on the second quantum bit, the first engine component, and the instruction. An advantage of such a system is that it can enable a mapping system for quantum computing applications to more quickly and more efficiently develop and deploy applications on one or more quantum computing resources.

According to another embodiment, a computer program product facilitating a quantum state measurement backend process is provided. The computer program product comprising a computer readable storage medium having program instructions embodied therewith, the program instructions executable by a processor to cause the processor to facilitate mapping conditional execution logic to quantum computing resources. In this example, the computer program product can include a computer readable storage medium having program instructions embodied therewith, the program instructions executable by a processor to cause the processor to map, by the processor, a logical reference to a quantum bit data structure in an instruction, to a first engine component, and deploy, by the processor, the first engine component to a first block controller component operatively connected to a first quantum computing resource, wherein the first engine component controls the first quantum computing resource based on the instruction. An advantage of such a system is that it can enable a mapping system for quantum computing applications to more quickly and more efficiently develop and deploy applications on one or more quantum computing resources.

In some embodiments, the program instructions are further executable by the processor to cause the processor to utilize the first block controller component is operatively connected to a first quantum bit of the first quantum computing resource, and facilitate the first engine component controlling the first quantum computing resource further based on the first quantum bit. An advantage of such a system is that it can enable a mapping system for quantum computing applications to more quickly and more efficiently develop and deploy applications on one or more quantum computing resources.

DESCRIPTION OF THE DRAWINGS

FIGS. 7B-7C illustrate a block diagram of a non-limiting example of a combiner of an engine component, in accordance with one or more embodiments.

FIGS. 7D-7E provide a non-limiting illustration of the operation of an instruction sequencing component, in accordance with one or more embodiments.

DETAILED DESCRIPTION

Figure 1:
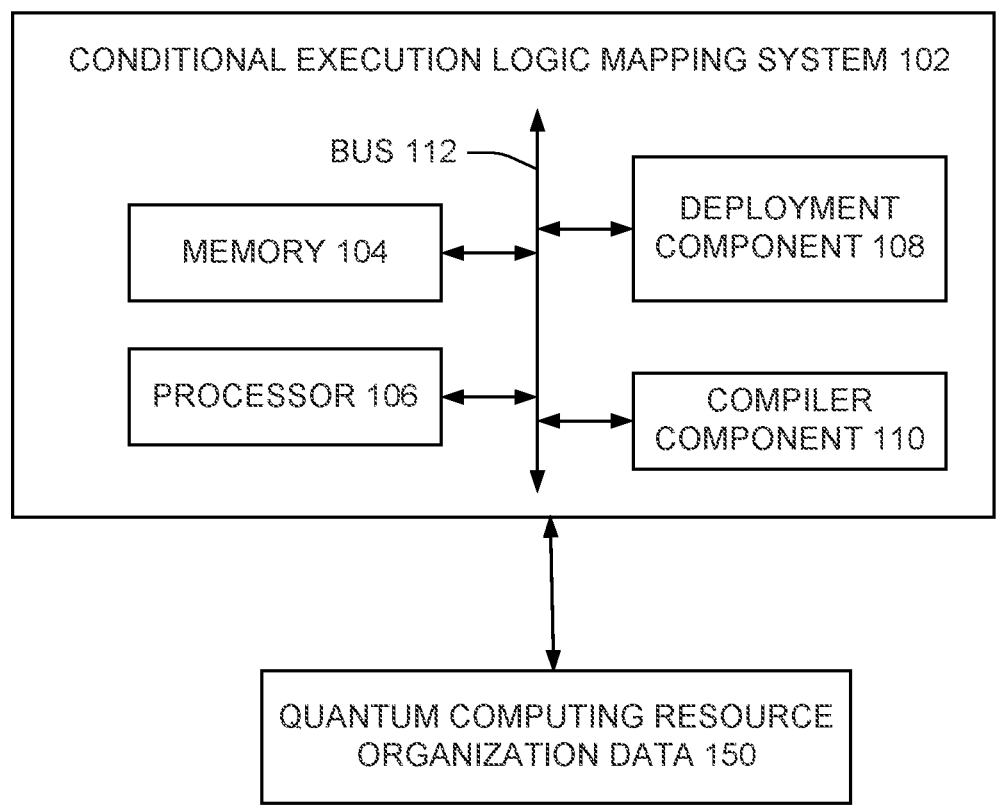
FIG. 1 illustrates a block diagram of an example, non-limiting system that can facilitate mapping conditional execution logic to quantum computing resources, in accordance with one or more embodiments described herein.

The following detailed description is merely illustrative and is not intended to limit embodiments and application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Quantum computing is generally the use of quantum-mechanical phenomena for the purpose of performing computing and information processing functions. Quantum computing can be viewed in contrast to classical computing, which generally operates on binary values with transistors. That is, while classical computers can operate on bit values that are either 0 or 1, quantum computers operate on quantum bits (qubits) that comprise superpositions of both 0 and 1, can entangle multiple quantum bits, and use interference.

Given the problems described above with some existing quantum application development and deployment technologies, the present disclosure can be implemented to produce a solution to these problems in the form of systems, computer-implemented methods, and computer program products that can facilitate the use of a compiler component having access to organizational data about particular quantum computing resources. An advantage of such systems, computer-implemented methods, and computer program products is that they can be implemented to facilitate the development and distribution of quantum applications among different quantum computing resources.

In some embodiments, the present disclosure can be implemented to produce a solution to the problems described above in the form of systems, computer-implemented methods, and computer program products that can utilize structural organization data regarding quantum computing resources. A further advantage of such systems, computer-implemented methods, and computer program products is that they can be implemented to not only deploy applications on different quantum computing resources, but also to improve the performance of quantum applications, e.g., by assessing aspects such as the communications latency between different components of a quantum computing resource.

It will be understood that when an element is referred to herein as being "coupled" to another element, it can describe one or more different types of coupling. For example, when an element is referred to herein as being "coupled" to another element, it can described one or more different types of coupling including, but not limited to, chemical coupling, communicative coupling, capacitive coupling, electrical coupling, electromagnetic coupling, inductive coupling, operative coupling, optical coupling, physical coupling, thermal coupling, and another type of coupling.

As referenced herein, an entity can comprise a human, a client, a user, a computing device, a software application, an agent, a machine learning model, an artificial intelligence, and another entity. It should be appreciated that such an entity can implement one or more embodiments of the subject disclosure described herein.

FIG. 1 illustrates a block diagram of an example, non-limiting system 100 that can facilitate mapping conditional execution logic to quantum computing resources, in accordance with one or more embodiments described herein. Repetitive description of like elements and processes employed in respective embodiments is omitted for sake of brevity.

In one or more embodiments, system 100 can comprise a conditional execution logic mapping system 102 coupled to quantum computing resource organization data 150, both of which can be associated with a cloud computing environment. For example, conditional execution logic mapping system 102 can be associated with cloud computing environment 1150 described below with reference to FIG. 11 and one or more functional abstraction layers described below with reference to FIG. 12 (e.g., hardware and software layer 1260, virtualization layer 1270, management layer 1280, and workloads layer 1290).

Example tasks that can, by one or more embodiments, be performed with cloud computing resources include, but are not limited to, interpreting and utilizing quantum computing resource organization data 150 and the compiling of jobs into deployable execution logic components. It should be noted that, as discussed in detail below, some of the advantageous features of embodiments described herein, include the design and distribution of conditional execution logic so as to be executed with very little command latency, e.g., deployed in block controller components, described in detail below. As would be appreciated by one having skill in the relevant art(s), given the description herein, this low latency can be significant because of the coherence time of some quantum bits used by the system.

Conditional execution logic mapping system 102 and components thereof (e.g., deployment component 108, compiler component 110, etc.) can employ one or more computing resources of cloud computing environment 1150 described below with reference to FIG. 11 and one or more functional abstraction layers (e.g., quantum software, etc.) described below with reference to FIG. 12 to execute one or more operations in accordance with one or more embodiments of the subject disclosure described herein. For example, cloud computing environment 1150 and such one or more functional abstraction layers can comprise one or more classical computing devices (e.g., classical computer, classical processor, virtual machine, server, etc.), quantum hardware, and quantum software (e.g., quantum computing device, quantum computer, quantum processor, quantum circuit simulation software, superconducting circuit, etc.) that can be employed by conditional execution logic mapping system 102 and components thereof to execute one or more operations in accordance with one or more embodiments of the subject disclosure described herein. For instance, conditional execution logic mapping system 102 and components thereof can employ such one or more classical and quantum computing resources to execute one or more classical and quantum: mathematical function, calculation, and equation; computing and processing script; algorithm; model (e.g., artificial intelligence (AI) model, machine learning (ML) model, etc.); and another operation in accordance with one or more embodiments of the subject disclosure described herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

As illustrated in the example embodiment depicted in FIG. 1, conditional execution logic mapping system 102 can comprise memory 104, processor 106, deployment component 108, compiler component 110, and bus 112.

It should be appreciated that the embodiments of the subject disclosure depicted in various figures disclosed herein are for illustration only, and as such, the architecture of such embodiments are not limited to the systems, devices, and components depicted therein. For example, in some embodiments, system 100 and conditional execution logic mapping system 102 can further comprise various computer and computing-based elements described herein with reference to operating environment 1000 and FIG. 10. In several embodiments, such computer and computing-based elements can be used in connection with implementing one or more of the systems, devices, components, and computer-implemented operations shown and described in connection with FIG. 1 and other figures disclosed herein.

Memory 104 can store one or more computer and machine readable, writable, and executable components and instructions that, when executed by processor 106 (e.g., a classical processor, a quantum processor, etc.), can facilitate performance of operations defined by the executable components and instructions. For example, memory 104 can store computer and machine readable, writable, and executable components and instructions that, when executed by processor 106, can facilitate execution of the various functions described herein relating to conditional execution logic mapping system 102, deployment component 108, compiler component 110, and another component associated with conditional execution logic mapping system 102 as described herein with or without reference to the various figures of the subject disclosure.

Memory 104 can comprise volatile memory (e.g., random access memory (RAM), static RAM (SRAM), dynamic RAM (DRAM), etc.) and non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 104 are described below with reference to system memory 1016 and FIG. 10. Such examples of memory 104 can be employed to implement any embodiments of the subject disclosure.

Processor 106 can comprise one or more types of processors and electronic circuitry (e.g., a classical processor, a quantum processor, etc.) that can implement one or more computer and machine readable, writable, and executable components and instructions that can be stored on memory 104. For example, processor 106 can perform various operations that can be specified by such computer and machine readable, writable, and executable components and instructions including, but not limited to, logic, control, input/output (I/O), arithmetic, and the like. In some embodiments, processor 106 can comprise one or more central processing unit, multi-core processor, microprocessor, dual microprocessors, microcontroller, System on a Chip (SOC), array processor, vector processor, quantum processor, and another type of processor. Further examples of processor 106 are described below with reference to processing unit 1014 and FIG. 10. Such examples of processor 106 can be employed to implement any embodiments of the subject disclosure.

Conditional execution logic mapping system 102, memory 104, processor 106, deployment component 108, compiler component 110, and any other component of conditional execution logic mapping system 102 as described herein, can be communicatively, electrically, operatively, and optically coupled to one another via a bus 112 to perform functions of system 100, conditional execution logic mapping system 102, and any components coupled therewith. Bus 112 can comprise one or more memory bus, memory controller, peripheral bus, external bus, local bus, a quantum bus, and another type of bus that can employ various bus architectures. Further examples of bus 112 are described below with reference to system bus 1018 and FIG. 10. Such examples of bus 112 can be employed to implement any embodiments of the subject disclosure.

Conditional execution logic mapping system 102 can comprise any type of component, machine, device, facility, apparatus, and instrument that comprises a processor and can be capable of effective and operative communication with a wired and wireless network. All such embodiments are envisioned. For example, conditional execution logic mapping system 102 can comprise a server device, a computing device, a general-purpose computer, a special-purpose computer, a quantum computing device (e.g., a quantum computer), a tablet computing device, a handheld device, a server class computing machine and database, a laptop computer, a notebook computer, a desktop computer, a cell phone, a smart phone, a consumer appliance and instrumentation, an industrial and commercial device, a digital assistant, a multimedia Internet enabled phone, a multimedia players, and another type of device.

Conditional execution logic mapping system 102 can be coupled (e.g., communicatively, electrically, operatively, optically, etc.) to one or more external systems, sources, and devices (e.g., classical and quantum computing devices, communication devices, etc.) via a data cable (e.g., High-Definition Multimedia Interface (HDMI), recommended standard (RS) 232, Ethernet cable, etc.). In some embodiments, conditional execution logic mapping system 102 can be coupled (e.g., communicatively, electrically, operatively, optically, etc.) to one or more external systems, sources, and devices (e.g., classical and quantum computing devices, communication devices, etc.) via a network.

In some embodiments, such a network can comprise wired and wireless networks, including, but not limited to, a cellular network, a wide area network (WAN) (e.g., the Internet) or a local area network (LAN). For example, conditional execution logic mapping system 102 can communicate with one or more external systems, sources, and devices, for instance, computing devices (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and other proprietary and non-proprietary communication protocols. In such an example, conditional execution logic mapping system 102 can thus include hardware (e.g., a central processing unit (CPU), a transceiver, a decoder, quantum hardware, a quantum processor, etc.), software (e.g., a set of threads, a set of processes, software in execution, quantum pulse schedule, quantum circuit, quantum gates, etc.) or a combination of hardware and software that facilitates communicating information between conditional execution logic mapping system 102 and external systems, sources, and devices (e.g., computing devices, communication devices, etc.).

Conditional execution logic mapping system 102 can comprise one or more computer and machine readable, writable, and executable components and instructions that, when executed by processor 106 (e.g., a classical processor, a quantum processor, etc.), can facilitate performance of operations defined by such components and instructions. Further, in numerous embodiments, any component associated with conditional execution logic mapping system 102, as described herein with or without reference to the various figures of the subject disclosure, can comprise one or more computer and machine readable, writable, and executable components and instructions that, when executed by processor 106, can facilitate performance of operations defined by such components and instructions. For example, deployment component 108, compiler component 110, and any other components associated with conditional execution logic mapping system 102 as disclosed herein (e.g., communicatively, electronically, operatively, and optically coupled with and employed by conditional execution logic mapping system 102), can comprise such computer and machine readable, writable, and executable components and instructions. Consequently, according to numerous embodiments, conditional execution logic mapping system 102 and any components associated therewith as disclosed herein, can employ processor 106 to execute such computer and machine readable, writable, and executable components and instructions to facilitate performance of one or more operations described herein with reference to conditional execution logic mapping system 102 and any such components associated therewith.

Conditional execution logic mapping system 102 can facilitate (e.g., via processor 106) performance of operations executed by and associated with one or more components thereof (e.g., deployment component 108, compiler component 110, etc.). For example, conditional execution logic mapping system 102 can facilitate (e.g., via processor 106): defining system configuration and programming functions for quantum computing resources.

In another example, conditional execution logic mapping system 102 can facilitate (e.g., via processor 106), mapping, by a system operatively coupled to a processor, a logical reference to a quantum bit data structure in an instruction, to a first engine component, and deploying, by the system, the first engine component to a first block controller component operatively connected to a first quantum computing resource, with the first engine component being in control of the first quantum computing resource based on the instruction. In a variation of this example, conditional execution logic mapping system 102 can facilitate (e.g., via processor 106), deploying, by the system, a second engine component to a second block controller component operatively connected to a second quantum bit of the first quantum computing resource and the first block controller component, with the second engine component controlling the first quantum computing resource based on the second quantum bit, the first engine component, and the instruction.

In one or more embodiments, compiler component 110 can (e.g., via processor 106) map a logical reference to a quantum bit data structure in an instruction, to a first engine component. Further, deployment component 108 can deploy the first engine component to a first block controller component operatively connected to a first quantum computing resource, with the first engine component controlling the first quantum computing resource based on the instruction. According to another embodiment, as discussed with FIG. 2 below, compiler component 110 can further map the program logic of job 225 to a third engine component operatively coupled to a third quantum bit of a second quantum computing resource, with the first quantum computing resource and the second quantum computing resource being quantum computing devices with different structures.

Figure 2:
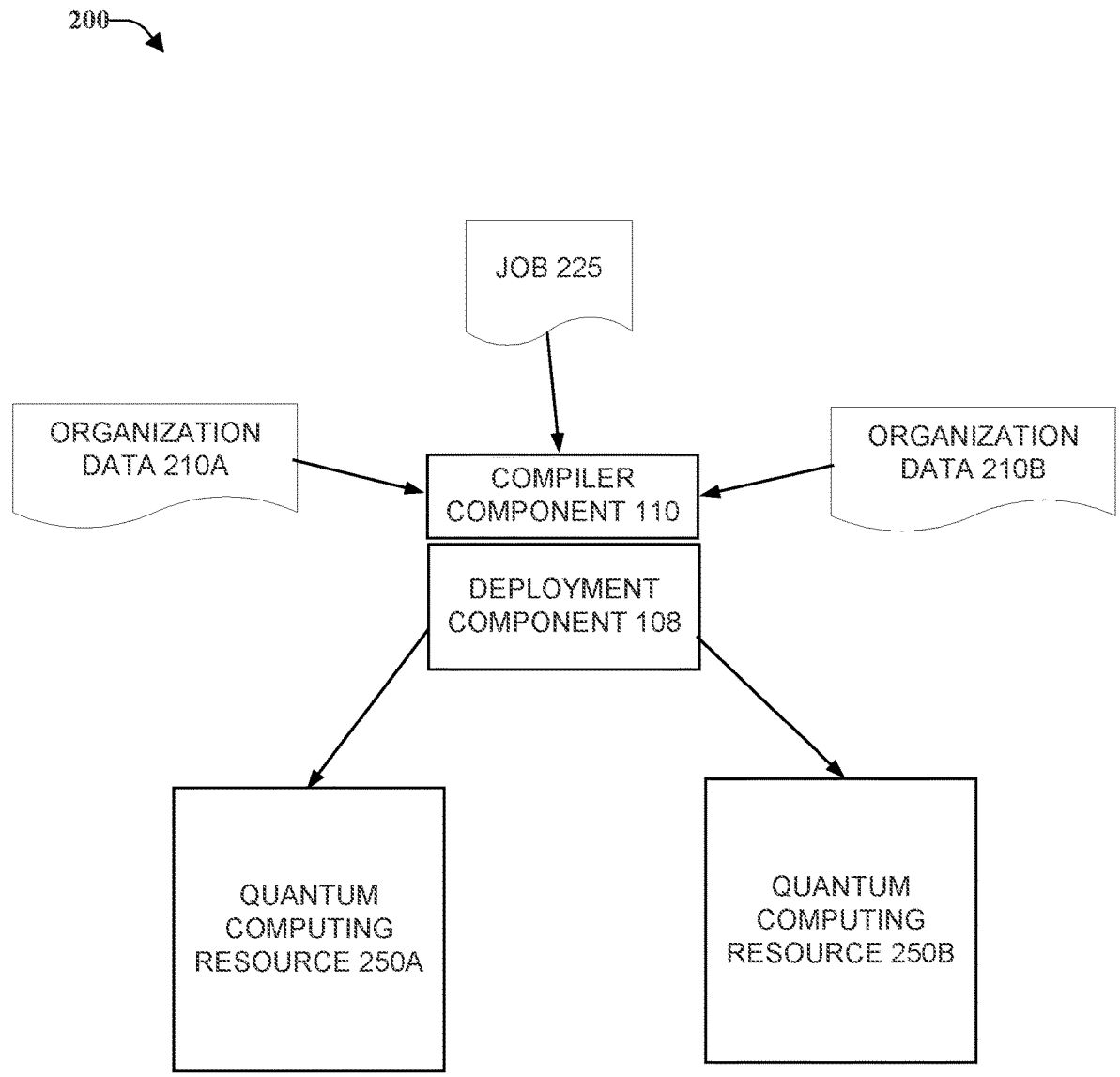
FIGS. 2 and 3 illustrate a block diagram of an example, non-limiting flow diagram, and system that can facilitate mapping conditional execution logic to quantum computing resources, in accordance with one or more embodiments described herein.
Figure 3:
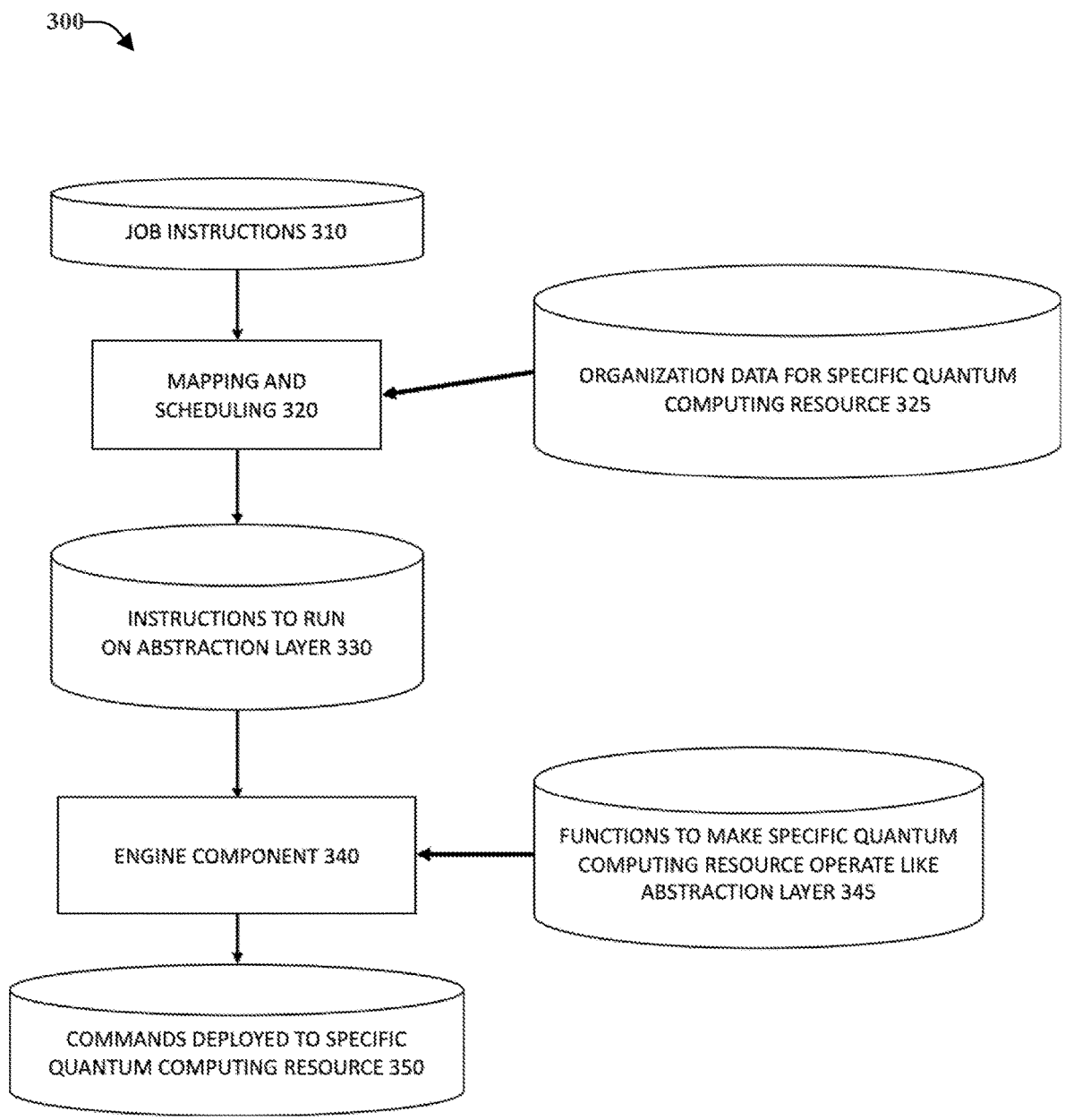

FIGS. 2 and 3 illustrate a block diagram of an example, non-limiting flow diagram 300, and system 200 that can facilitate mapping conditional execution logic to quantum computing resources, in accordance with one or more embodiments described herein. Repetitive description of like elements and processes employed in respective embodiments is omitted for sake of brevity.

In one or more embodiments, system 200 can include compiler component 110, deployment component 108, quantum computing resources 250A-B, and any other components that facilitate the functions of system 200, described below. As discussed further below, compiler component 110 can receive information corresponding to job 225, and organization data 210A-B.

Given the problems described above with some existing approaches to reusing a job (e.g., job 225) with multiple quantum computing resources 250A-B, as depicted in FIG. 2 and discussed below, the present disclosure can be implemented to produce a solution to this problem. Approaches described herein can be in the form of systems, computer-implemented methods, and computer program products that can use a single compiler component 110 (e.g., not having to use different versions of compiler component 110 for different quantum computing resources 250A-B) to compile job 225 for multiple quantum computing resources 250A-B. Once compiled, deployment component 108 can be directed by the compiled job 225 to deploy different engine components to different elements of quantum computing resources 250A-B.

As would be appreciated by one having skill in the relevant art(s), given the description herein, different characteristics of quantum computing resources can vary among systems, and these differences currently require time-consuming customization of compiled instructions, to improve the likelihood of uniform functioning among quantum computing resource 250A-B. Example differences between quantum computing resource 250A-B that can affect deployment of a job include, but are not limited to, the structure and interconnect of the various layers that may or may not be involved (e.g., layers are discussed with FIGS. 4 and 5 below), the location and mapping of registers implemented in the resource, support of conditional logic and extended measurements, and the latencies associated with paths between components. Additional differences are discussed with detailed examples of implementations discussed with FIGS. 6 and 7 below.

In an example implementation, after deployment of program logic by deployment component 108 at elements of quantum computing resource 250A, compiler component 110 can utilize organizational data 210B to map the program logic of job 225 to an engine component operatively coupled to elements of quantum computing resource 250B. An advantage of such a system is that it can enable a mapping system for quantum computing applications to more quickly and more efficiently develop and deploy applications on one or more quantum computing resources.

FIG. 3 depicts example implementations that can include features the can facilitate the beneficial results discussed with FIG. 2 above. For illustration purposes, the flow diagram of FIG. 3 depicts a conditional abstraction layer representing a general structure and characteristics that can be used to select quantum computing resources with which some embodiments discussed herein can be used, e.g., to improve the likelihood of successful execution.

In one or more embodiments, the variety of different quantum computing resources that can be utilized can be improved by the use of organization data 210A-B. Thus, as depicted in FIG. 3, job instructions 310, with block 325, can be mapped and scheduled 320 for a particular quantum computing resource 250A, by the use of organization data 210A. In one implementation, specific characteristics of a resource can be used to customize the conditional abstraction layer by using parameters.

In an additional set of features discussed with FIGS. 4-7 below, in one or more embodiments, once parameterized instructions (e.g., block 325) are generated for a particular quantum computing resource, the functions 345 of the instructions can be distributed to different execution components for execution, e.g., in engine components 340 generate by compiler component 110 and deployed to block controller components by deployment component 108. Thus, at block 350, as generally described above, one or more embodiments can implement job instructions 310 in a variety of ways, as commands for particular quantum computing resources 250A-B.

It should be appreciated that compiling a single representation of a job, and facilitating the use of the same job on multiple quantum machines can reduce the customization effort needed to customize the job for different machines and improve the standardization of deployments to different machines. These and other examples discussed herein illustrate the reduction in computation costs that can, in some circumstances, result from use of different embodiments described herein.

Figure 4:
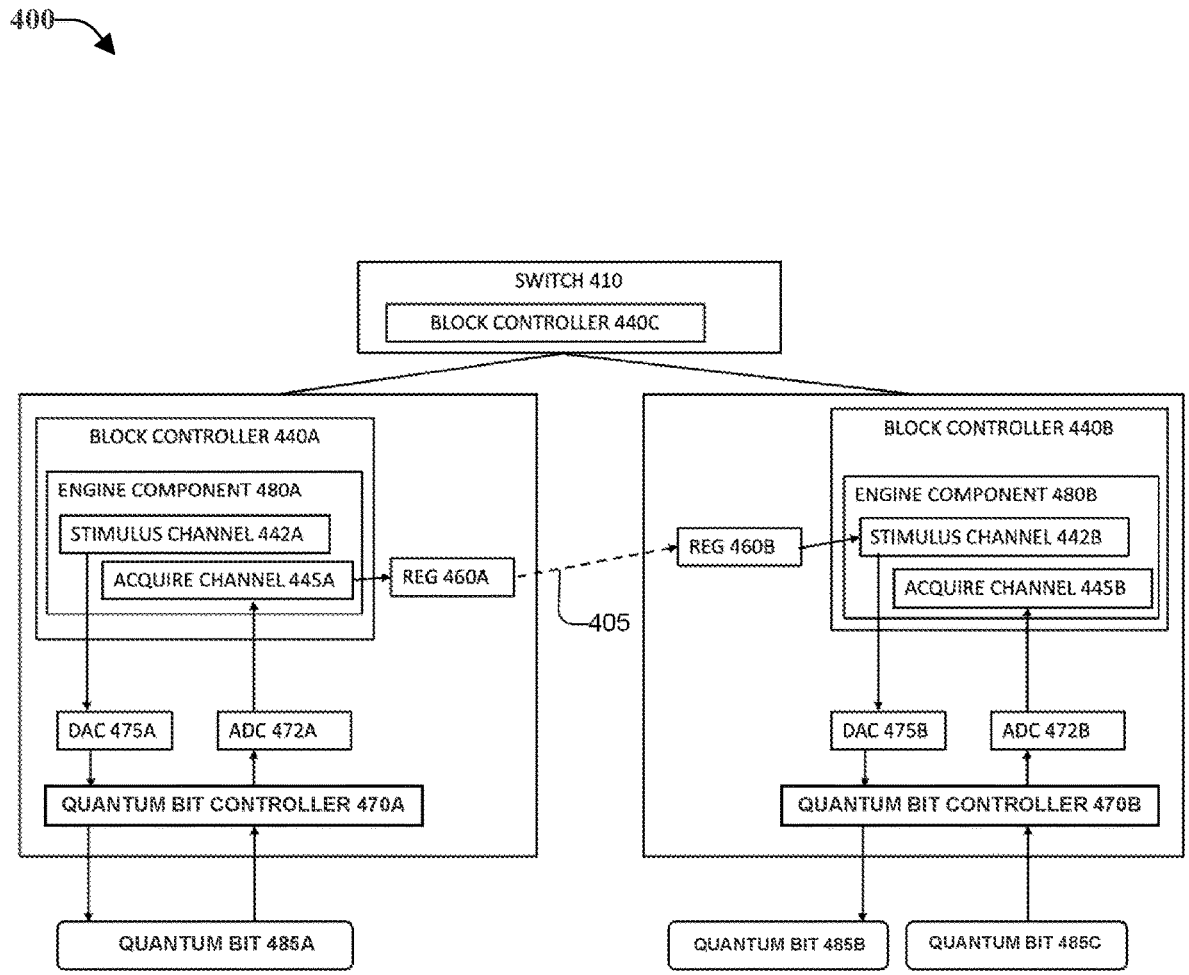
FIG. 4 illustrates a block diagram of an example, non-limiting system that can facilitate utilizing distributed processing to facilitate the mapping of conditional execution logic to quantum computing resources, in accordance with one or more embodiments described herein.

FIG. 4 illustrates a block diagram of an example, non-limiting system 400 that can facilitate utilizing distributed processing to facilitate the mapping of conditional execution logic to quantum computing resources, in accordance with one or more embodiments described herein. Repetitive description of like elements and processes employed in respective embodiments is omitted for sake of brevity.

As depicted in FIG. 4, in one or more embodiments of system 400 can include, block controller components 440A-C arranged in a hierarchical structure and quantum bits 485A-C, and any other components that facilitate the functions of system 200, described below. Block controller components 440A-B can respectively include engine components 480A-B, digital to analog converters (DAC) 475A-B, analog to digital converters (ADCs) 472A-B, and quantum bit controllers 470A-B.

It should be appreciated that the term block controller component is used throughout this disclosure to illustrate a destination for example deployments of customized program logic to different elements of a quantum computing resource. In one or more embodiments, one or more of block controller components 440A-B can be implemented by field-programmable gate arrays (FPGAs) that receive programming from deployment component 108 and implement the logic, for example, discussed with FIG. 4 below. This example is non-limiting, and other types of program storage can be used to facilitate the use of distributed engine components 480A-B.

In an example depicted FIG. 4, an example job can be created that tests for a condition in a first quantum bit, and, based on the result of the test, applies a quantum gate using a second and third quantum bit. For this example, the components of FIG. 4 noted above are a part of quantum computing resource 250A, discussed above. Thus, for compiling, in this example, so as to have a structure of the resource, compiler component 110 identifies organization data 210A. Utilizing organization data 210A, in this example, compiler component selects quantum bits 485A-C as the references first, second, and third, quantum bits, respectively, e.g., based on their characteristics and placement within quantum computing resource 250A.

Because of this quantum bit selection, in this example, block controller components 440A-B can be selected by compiler component 110, e.g., because these controllers are depicted with the other hardware associated with control of the respective bits. Based on the selection of block controller components 440A-B, in this example, as detailed below, different tasks can be allocated to block controller components 440A-B, and paths can be selected for interim data values (e.g., the results of the test of the first quantum bit), as well as the results of the specified gate being applied.

After deployment of engine components 480A-B, the operation of this example embodiment can begin with engine component 480A utilizing stimulus channel 442A to send data corresponding to the test to DAC 475A and quantum bit controller 470A. By an operation of quantum bit controller 470A, a result is received from quantum bit 485A and converted to digital data by ADC 472A. Execution of the program logic of engine component 480A can be resumed with the receipt of this digital data, and the results can be interpreted as either a true (1) or false (0) value, which can be stored in register 460A. Continuing this example, either automatically or by operation of the program logic of engine component 480A, the condition bit can be relayed to register 460B at block controller component 440B.

For this relay operation, it should be noted that, as depicted in FIG. 4, two paths are shown between register 460A and register 460B, e.g., a hierarchical route via switch 410 and a direct route (e.g., peer-to-peer connection 405) between the hardware of block controller components 440A-B. In one or more embodiments, the existence of these routes, along with an estimated latency of each route can be stored in organization data 210A. In this example, compiler component 110 evaluated the two routes and, for the relay of the result value from register 460A to 460B, peer-to-peer connection 405 was selected, and this selection was incorporated in the logic of block controller component 440A. If the alternate route through switch 410 were selected however, one or more embodiments could have deployed logic for handling the result value in block controller component 440C.

Continuing this example, block controller component 440B, by employing the program logic deployed by compiler component 110 receives the result value from register 460B, and program logic determines whether to apply the specified gate by utilizing quantum bits 485B-C. In this example, when the condition indicates that the gate be applied, stimulus channel 442B can be triggered to send data corresponding to the application of the gate to DAC 475B and quantum bit controller 470B. By an operation of quantum bit controller 470A, the gate is applied, and a success indicator is detected by quantum bit controller 470B. By operation of the logic of engine component 480B, this indication of success can be converted to digital data by ADC 472B. Concluding this example, with the receiving and reporting of the success of the application of the applied gate, the execution of the compiled and deployed example job ends.

It should be appreciated that this example is non-limiting, and intended to illustrate one approach that can be taken to implement the deployed program logic described above.

Figure 5:
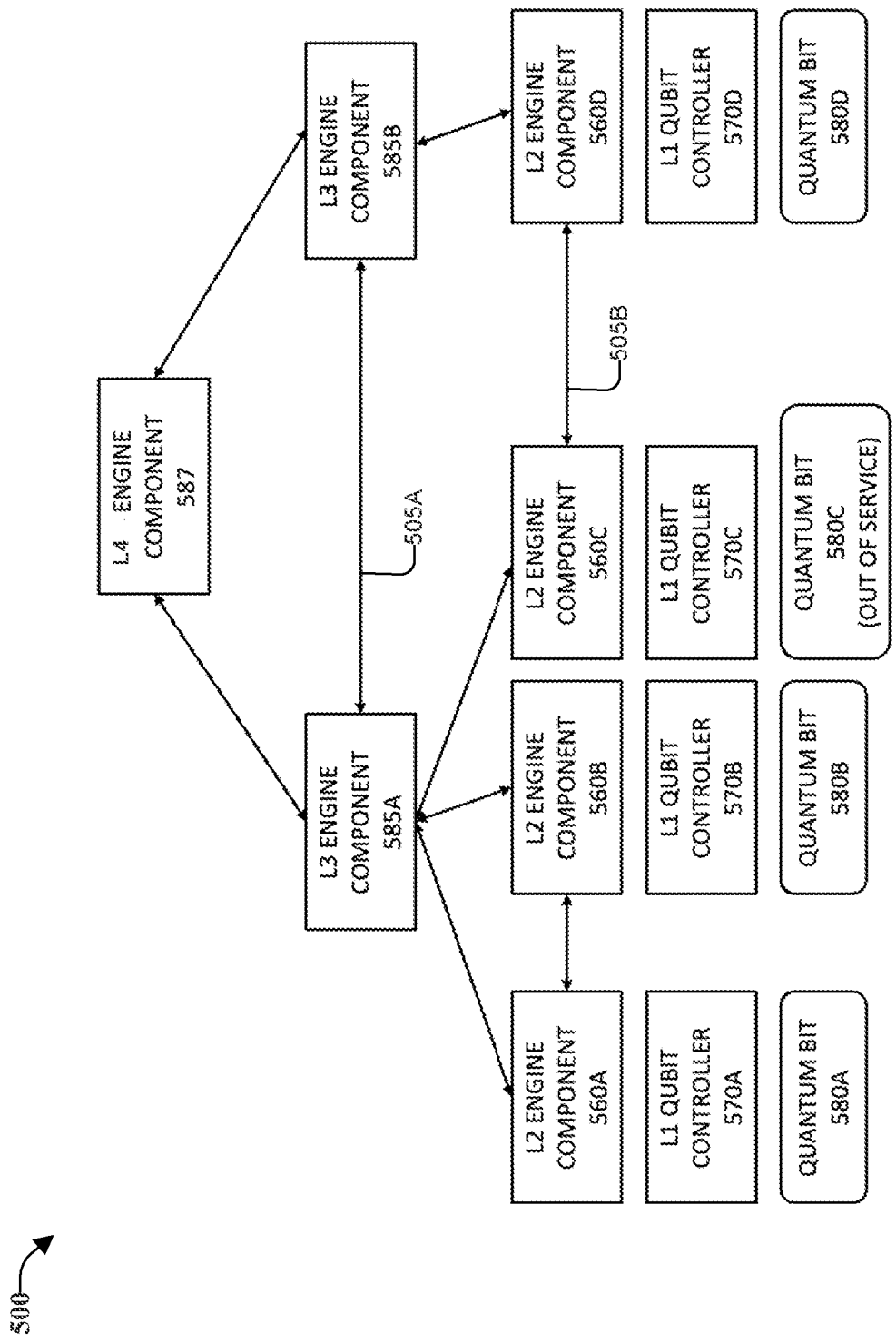
FIG. 5 illustrates a block diagram of an example, non-limiting system that can facilitate linking different distributed processing resources to achieve benefits including improved performance for the conditional execution logic mapped to quantum computing resources, in accordance with one or more embodiments described herein.

FIG. 5 illustrates a block diagram of an example, non-limiting system 500 that can facilitate linking different distributed processing resources to achieve benefits including improved performance for the conditional execution logic mapped to quantum computing resources, in accordance with one or more embodiments described herein. Repetitive description of like elements and processes employed in respective embodiments is omitted for sake of brevity. In one or more embodiments, system 500 can include quantum bits 580A-D, level 1 (L1) quantum bit (qubit) controllers 570A-D, level 2 (L2) engine components 560A-D, level 3 (L3) engine components 585A-B, and level 4 (L4) engine component 587. It should be noted that, in this example, block controller components for engine components are omitted, along with the DACs or ADCs described above with FIG. 4.

As noted above, one of the aspects of one or more embodiments that can be discussed with FIG. 5 is the selection of locations for deployment of engine components 560A-D and the paths that can be evaluated and selected by compiler component 110, for implementing the compiled job, e.g., paths that can be used to pass values to different components according to program logic. As an illustration one or more benefits that can be realized by the use of some embodiments, an example can be considered where the only relay of programmatic values is performed hierarchically, e.g., where a value to be relayed by L2 engine component 560C is relayed, not by peer-to-peer connection 505B, but by relay via L3 engine component 585A, L4 engine component 587, and L3 engine component 585B.

To avoid this, one or more embodiments can beneficially organize the linkages of engine components in any way supported by hardware connections within the quantum computing resource, with connection topologies including, but not limited to, peer-to-peer, interactive mesh, ring, tree, and hierarchical arrangements. It should be noted that, although the example depicted uses a four layer hierarchy, this arrangement is only illustrative and other numbers of layers can be implemented by one or more embodiments. An advantage of such a system is that it can enable a mapping system for quantum computing applications to more quickly and more efficiently develop and deploy applications on one or more quantum computing resources, e.g., by using organizational data to compile an application with improved use of the structure of a particular quantum computing resource. An example negative outcome that can be avoided by the use of this structural organization data includes points of congestion (e.g., choke points) among quantum computing resource elements.

In additional embodiments illustrated by FIG. 5, it should be noted that quantum bit 580C is labeled as out of service. In an existing implementation where quantum bits 580A-D are selected from for implantation of an operation, this up-to-date information regarding a particular resource of a quantum computing device would not necessarily be evaluated. In contrast, in one or more embodiments, operation status of different components of a quantum computing resource can be included in the organizational data for a resource, as described above. This status could range from the example depicted (e.g., not in service), to a measure of the performance of a component, e.g., processing speed measures.

Figure 6:
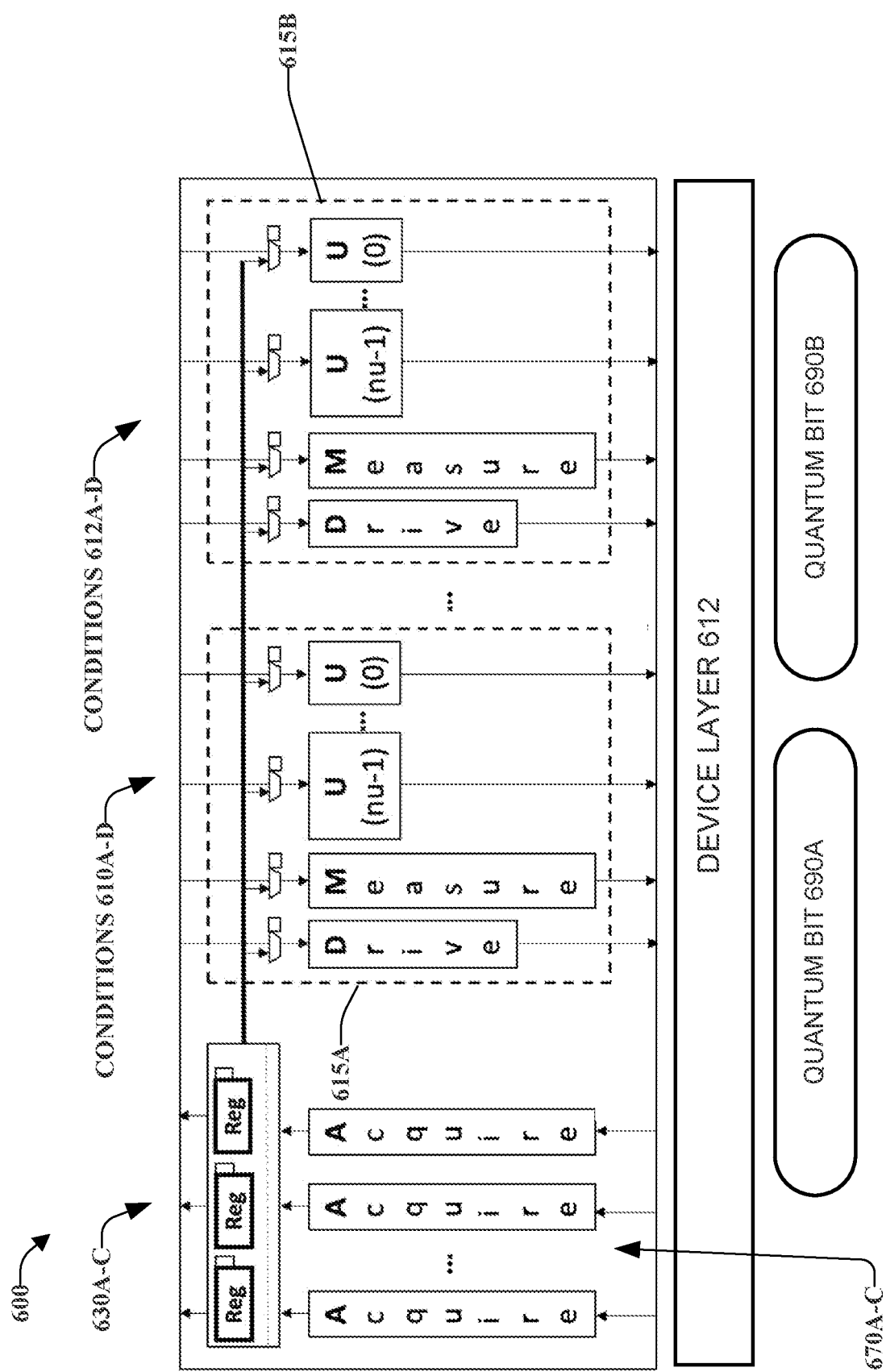
FIG. 6 illustrates a block diagram of an example, non-limiting system that can include parts of a quantum bit controller that can facilitate access to quantum bits for operation of compiled instructions discussed herein, in accordance with one or more embodiments.

FIG. 6 illustrates a block diagram of an example, non-limiting system 600 that can include parts of a quantum bit controller that can facilitate access to quantum bits for operation of compiled instructions discussed herein, in accordance with one or more embodiments. Repetitive description of like elements and processes employed in respective embodiments is omitted for sake of brevity. For example, system 600 includes quantum bit controllers 615B and acquire channels 630A-C, device layer 612, and quantum bits 690A-B.

In one or more embodiments, to facilitate conditional execution of commands based on values of a quantum bit, a quantum bit controller can have additional features that facilitate the evaluation of conditions, and different quantum bit controller operations can be based on this evaluation. For example, system 600 includes two quantum bit controllers 615A-B with each having an example drive channel (D), measurement channel (M), and U-channels, for use with device layer 612. In an implemented feature of one or more embodiments, each of the stimulus channels noted above can have a MUX for testing conditions, e.g., conditions 610A-D and 612A-D. In one or more embodiments, this can be implemented to improve the performance of conditional execution applications, e.g., because the source of the condition bit tested can change during the execution of the circuit. It should be appreciated that this logic can be controlled by compiler component 110 as a part of deploying the program logic on a particular quantum computing resource.

In an additional feature, to reduce latency in the results measured from a quantum bit being available, in one or more embodiments, and registers of channels 630A-C can be used for each acquire channel 670A-C, e.g., quantum bit measurements can be passed into the corresponding register as they are produced, and by program logic, register output may be routed directly to stimulus channels in the same quantum bit controller, or to other conditional execution logic outside the block controller.

It should be appreciated that, for many of the memory resources discussed herein (e.g., registers, memory, buffers), the location, performance, latency, size, and availability of such resources can be incorporated in the organization data used by compiler component 110. One having skill in the relevant art(s), given the description herein, will appreciate the different ways that such data can be utilized to improve performance, as well as other suggested information that can be similarly used.

Figure 7A:
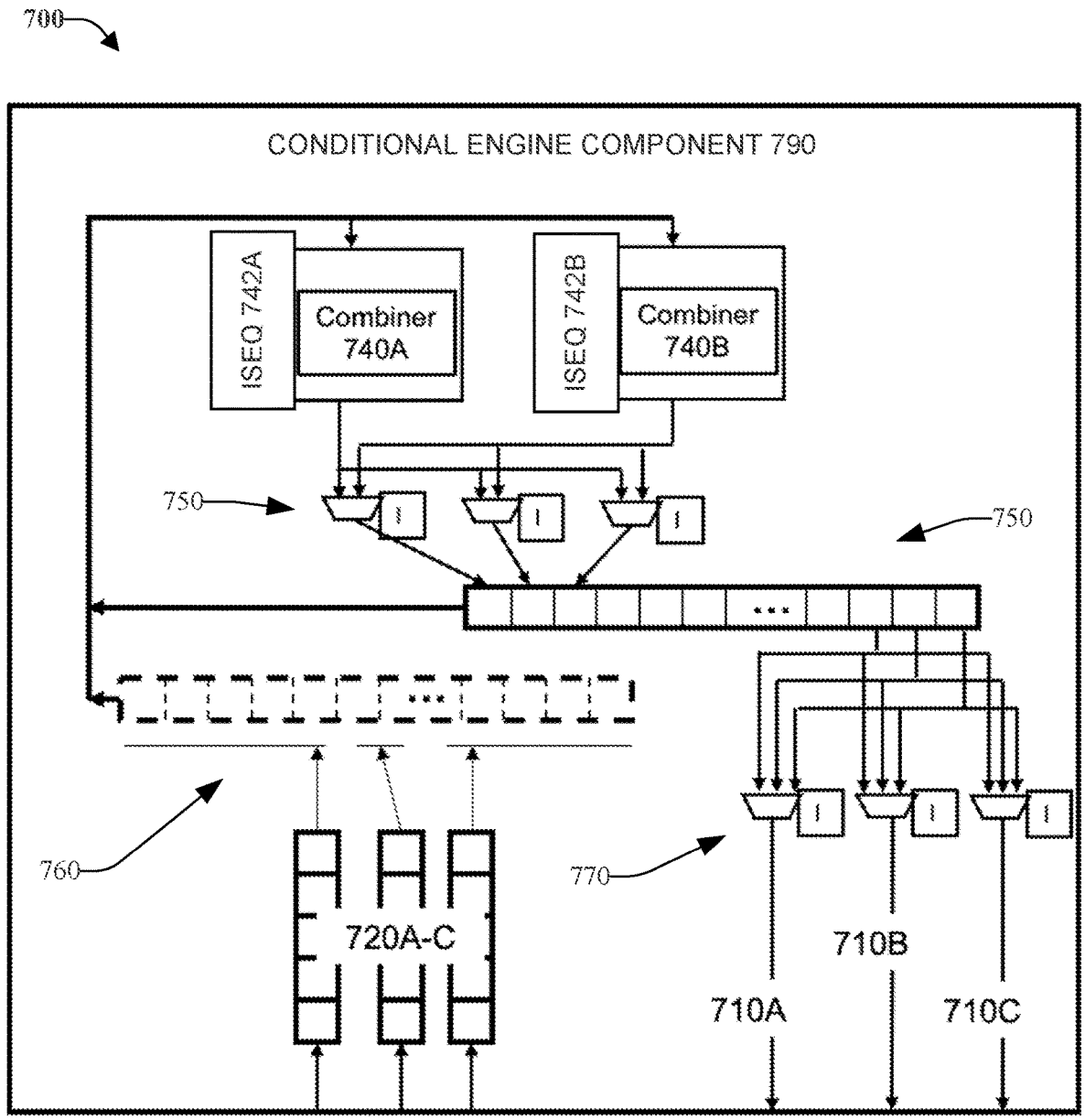
FIG. 7A illustrates a block diagram of a non-limiting example of an implementation of an engine component to be deployed within a block controller component, in accordance with one or more embodiments.

FIG. 7A illustrates a block diagram of a non-limiting example 700 of an implementation of an engine component to be deployed in a quantum computing resource (e.g., within a block controller), in accordance with one or more embodiments. Repetitive description of like elements and processes employed in respective embodiments is omitted for sake of brevity. As depicted, example 700 of conditional engine component 790 includes receive buffers 720A-C, receive registers 760, result registers 750, combiners 740A-B, combiner-specific instruction sequencing components (ISEQ) 724A-B (discussed with FIGS. 7D-E below), and send channels 710A-C.

In a non-limiting example depicted in FIG. 7A, when one or more embodiments of the engine components described herein have specific features that can facilitate conditional execution, this engine component can be termed a conditional engine component, e.g., conditional engine component 790. It should be noted that, while conditional execution examples are used throughout this disclosure, these are intended to be illustrative only, and embodiments are not limited thereto, e.g., other combinations of programming elements can be used with one or more embodiments. Returning to the example of conditional execution described with FIG. 4 above, after a measurement value from a quantum bit is measured, conditional engine component 790 can be used to convert the measurement into a testable condition bit distributed to another engine component for conditional use. As discussed below, additional features can be utilized by one or more embodiments to further improve the performance of the conditional execution process.

In one or more embodiments, one of the ways that engine components can be configured to programmatically combine and pass quantum bit values around the system, as described above, is to use existing commands, implemented in some systems. For example, in one or more embodiments, a flat set of global registers and operators that use them. Example operators ('copy' and Boolean functions, such as: OR, NOR, shift, rotate, etc.) can already move post-discriminated binary quantum bit measurement values between registers to facilitate them being combined with Boolean functions, e.g., resulting in single bit, testable conditions. These testable conditions can then be used by waveform players to determine whether to apply a quantum gate or not. It should be appreciated that, by incorporating the use of these operators with the operation, as described and suggested herein, of compiler component 110 and deployment component 108, the performance, flexibility, and ease of distribution of applications to additional resources, can be improved. Some elements of embodiments of conditional engine component 790 are described below.

Receive buffers 720A-C are described as follows:

In an example approach to implementing a bfunc command, in one or more embodiments, binary quantum bit values can be received by the engine component (e.g., conditional engine component 790) through arrays of bits termed receive buffers 720A-C. At the start of a job, all receive buffers can begin filling and stay filled. In one or more embodiments, the presence and size of receive buffers can be available to compiler component 110 to help improve the operation of the program logic. For example, if more quantum bit measurement results arrive than the buffer can hold, it can be considered an error, so compiler component 110 can be set to minimize or eliminate the likelihood of this result.

Receive registers 760 are described as follows:

To be processed by combiners 740A-B where Boolean functions can be performed, receive buffer values can be concatenated into a single receive register 760 vector. In one or more embodiments, the quantum computing resource can implement this register as a virtual or physical concatenation. In the virtual concatenation, one or more embodiments can utilize receive registers 760 as a virtual object, e.g., a "copy" command cannot be used to copy a quantum bit value from receive buffer 720A into receive registers 760.

Result registers 750 are described as follows:

In one or more embodiments, as depicted, result registers 750 can receive and store combiner 740A-B results for further use. In contrast, receive registers 760 can be written by other elements, e.g., quantum bit controllers and other engine components. In an example, to implement a 'copy' command or to allow the result of a 'bfunc' command to be used by another part of the system, this result can be fed back into the combiners 740A-B as inputs. Additionally, as discussed with FIG. 4 above. They can also the source of bits sent to other blocks, e.g., values relayed using peer-to-peer connection 405, e.g., register 460A relaying a value from block controller component 440A to block controller component 440B. In some implementations, the input vector generated can be the same for all combiners in conditional engine components 790.

In another embodiment, receive registers 760 and result registers 750 can be concatenated and passed into combiners 740A-B, which can execute 'bfunc' commands by combining selected receive register 760 inputs into a single binary output. Additional details regarding combiners 740A-B are provided with FIG. 7B below.

Figure 7B:
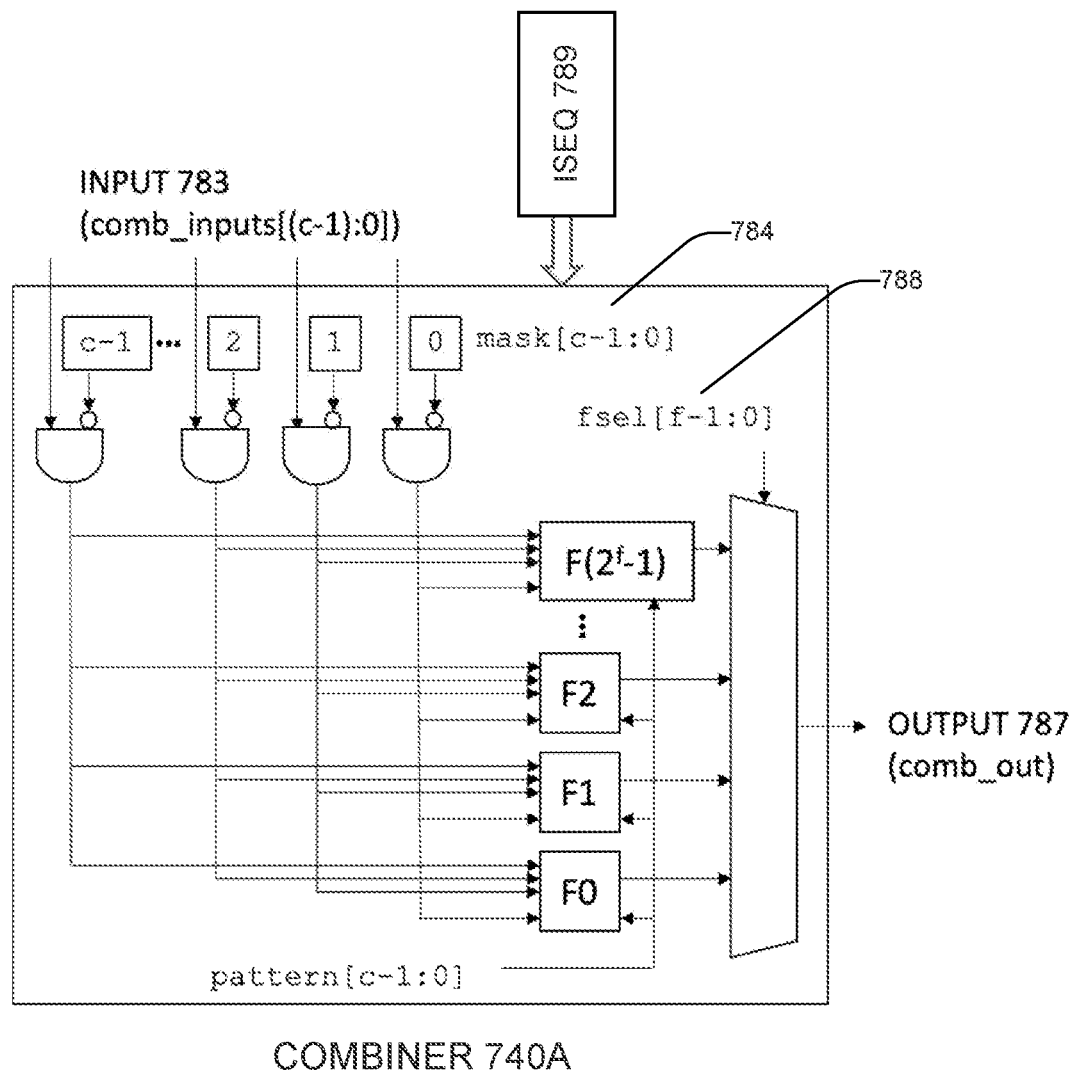

FIGS. 7B-C illustrate block diagrams of a non-limiting example 702 of a combiner of an engine component, in accordance with one or more embodiments. Example 702 includes combiner 740A receiving instruction sequencing information (discussed with FIGS. 7D-E below) from instruction sequencer 789, with input 783 and output 787 to and from other system processes described above.

In one or more embodiments, in addition to the implementation of Boolean functions, as described above combiners 740A-B can have additional features that can be utilized by one or more embodiments to further improve the performance of conditional engine component. 790. For example, inputs 783 into combiner 740A are individually maskable based on settings from compiler component 110. Advantages of this masking capability include being able to increase processing efficiency by facilitating the selection of a subset of inputs on which combiner 740A operates at a particular time.

In another application of masking: In one or more embodiments, at the start of a job, the contents of all receive buffers 720A-C and result registers 750 can be treated as containing unknown values, e.g., because they may not have been reset between jobs or experiment iterations. In one or more embodiments, organization data describing the quantum computing resource can include an indication that initial values from buffers 720A-C and result registers 750 are unknown. Based on this, compiler component 110 an include a configuration setting that initially masks input coming from these sources, e.g., preventing an unknown value from affecting combiner outputs and overall results of the job. In one or more embodiments, this masking setting can be received from instruction sequencer 789 as a part of the overall sequencing of commands. Further configuration of engine components by compiler component 110 can be enabled by, in some implementations, a number of combiners in an engine component being selected and set by compiler component 110.

In a related function of combiners 740A-B, in addition to masking settings, instruction sequencer can also provide patterns to be applied to the masked input values. Like other settings described above, these patterns are subject to program control generated and deployed by compiler component 110.

FIG. 7C provides an example 703 table of binary codes for selecting functions to be performed by combiners 740A-B. This table includes function select 782 codes with example operations that can be performed by combiners 740A-B. Like masking settings, these function codes can be received from instruction sequencer 789 as a part of the overall sequencing of commands Additional details regarding instruction sequencing components are provided with FIGS. 7D-E below.

FIGS. 7D-7E provide a non-limiting illustration of the operation of an instruction sequencing component, in accordance with one or more embodiments. FIG. 7D illustrates an example 704 list 777 of commands for a quantum computing resource, e.g., utilizing hardware control fields 774. In one or more embodiments, compiler 110 can generate this type of list for instruction sequencer 789 to use to control program execution.

In an advantageous implementation of this feature, one or more embodiments can compress this list 777 into a smaller size, e.g., preserving system resources by limiting processing. In example 706, FIG. 7E illustrates the resulting compressed list which can be distributed to engine components 480A-B to provide sequences of instructions. In this example, in the first five cycles of the execution of the job, hardware control fields 774 are specified by compiling component 110 to execute for five cycles. In one or more embodiments, before distributing information sequencer list 777 as a part of the distributed program logic, references to these five sequential hardware control fields can be simplified to the compressed 778 entry depicted in FIGS. 7D-E, e.g., by specifying a number of cycles 772 (5) and the hardware control fields 774.

In a particular type of entry in sequencer entries 773, the zero (0) value 769 can be included with hardware control fields 776. In some implementations, this value 769 can execute instructions (e.g., hardware control fields 776) that do not need to be specified by compiler component 110. For example, in one or more embodiments, this value 769 can cause an initialization of system data storage resources, e.g., to avoid the unknown values noted with discussion of combiners 740A-B above. In another example, in one or more embodiments, value 269 can be used to apply valid hardware control fields between the execution of jobs. In these examples value 269 being zero (0) indicates the indefinite amount of time associated with these processes.

In one or more embodiments, the functions of instruction sequencer 789 can be provided specifically to selected components. For example, to further improve performance in some circumstances, each combiner can have its own instruction sequencer, e.g., ISEQs 742A-B, can facilitate compiler component 110 to scheduling 'copy' and 'bfunc' operations at the time a job is compiled. In other embodiments, additional components which can use a compressed instruction sequencer 789 include, but are not limited to, output registers of acquire channels 630A-C, condition select multiplexers (e.g., testing conditions 610A-D) in the quantum bit controller, and registers including result register 750 selectors and send register selectors of send channels 710 in the conditional engine component. While similar in use, each component can utilize compressed instruction sequencers 789 with hardware control fields tailored to the logic managed by the sequencer.

Figure 8:
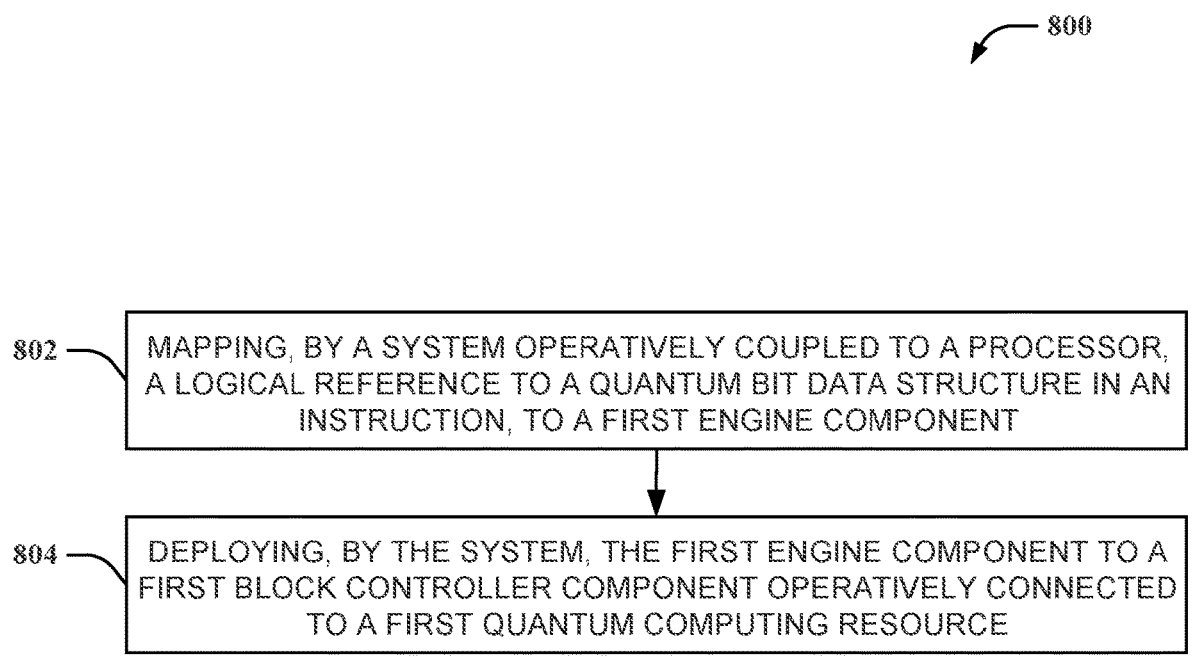
FIG. 8 illustrates a block diagram of an example, non-limiting system that can facilitate mapping conditional execution logic to quantum computing resources, in accordance with one or more embodiments described herein.

FIG. 8 illustrates a flow diagram of an example, non-limiting computer-implemented method 800 that can facilitate mapping conditional execution logic to quantum computing resources, in accordance with one or more embodiments described herein. Repetitive description of like elements and processes employed in respective embodiments is omitted for sake of brevity.

At 802, computer-implemented method 800 can comprise mapping, by a system operatively coupled to a processor, a logical reference to a quantum bit data structure in an instruction, to a first engine component. For example, in one or more embodiments, method 800 can include mapping, by system 100 operatively coupled to processor 106, a logical reference in job 225 to a quantum bit data structure in an instruction, to a first engine component, e.g., engine component 480A.

At 804, computer-implemented method 800 can comprise deploying, by the system, the first engine component to a first block controller component operatively connected to a first quantum computing resource. For example, in one or more embodiments, method 800 can include deploying, by system 100, engine component 480A to a block controller component 440A operatively connected to a quantum computing resource. In one or more embodiments, conditional execution logic mapping system 102 can provide technical improvements to systems, devices, components, operational steps, and processing steps associated with the various technologies identified above. For example, conditional execution logic mapping system 102 can comprise mapping logical references of a job to a quantum bit data structure in an instruction, to a first engine component. An advantage of such a system is that it can enable a mapping system for quantum computing applications to more quickly and more efficiently develop and deploy applications on one or more quantum computing resources.

In some embodiments, method 800 can further comprise deploying, by the system, the first engine component to a first block controller component operatively connected to a first quantum computing resource. In one or more embodiments, the first engine component can control the first quantum computing resource based on the instruction. An advantage of such a system is that it can enable a mapping system for quantum computing applications to more quickly and more efficiently develop and deploy applications on one or more quantum computing resources.

It should be appreciated that conditional execution logic mapping system 102 provides a new approach driven by relatively new quantum computing technologies. For example, conditional execution logic mapping system 102 provides a new approach to developing and implementing quantum computing software across a variety of quantum computing platforms.

At least in practical implementations, at scale, conditional execution logic mapping system 102 can employ combinations of hardware and software to solve problems that are highly technical in nature, that are not abstract and that cannot be performed as a set of mental acts by a human In some embodiments, one or more of the processes described herein can be performed by one or more specialized computers (e.g., a specialized processing unit, a specialized classical computer, a specialized quantum computer, etc.) to execute defined tasks related to the various technologies identified above. Conditional execution logic mapping system 102 and/or components thereof, can be employed to solve new problems that arise through advancements in technologies mentioned above, employment of quantum computing systems, cloud computing systems, computer architecture, and/or another technology.

It is to be appreciated that, in one or more embodiments, conditional execution logic mapping system 102 can utilize various combinations of electrical components, mechanical components, and circuitry that cannot be replicated in the mind of a human or performed by a human. As would be understood by one having skill in the relevant art(s), given the description herein, for practical implementations at scale the various operations that can be executed by conditional execution logic mapping system 102 and components thereof, are greater than the capability of a human mind. For instance, the amount of data processed, the speed of processing such data, or the types of data processed by conditional execution logic mapping system 102 over a certain period of time can be greater, faster, or different than the amount, speed, or data type that can be processed by a human mind over the same period of time.

According to several embodiments, conditional execution logic mapping system 102 can also be fully operational towards performing one or more other functions (e.g., fully powered on, fully executed, etc.) while also performing the various operations described herein. It should be appreciated that such simultaneous multi-operational execution is beyond the capability of a human mind. It should also be appreciated that conditional execution logic mapping system 102 can include information that is impossible to obtain manually by an entity, such as a human user. For example, the type, amount, and/or variety of information included in conditional execution logic mapping system 102, deployment component 108, and/or compiler component 110 can be more complex than information obtained manually by a human user.

Figure 9:
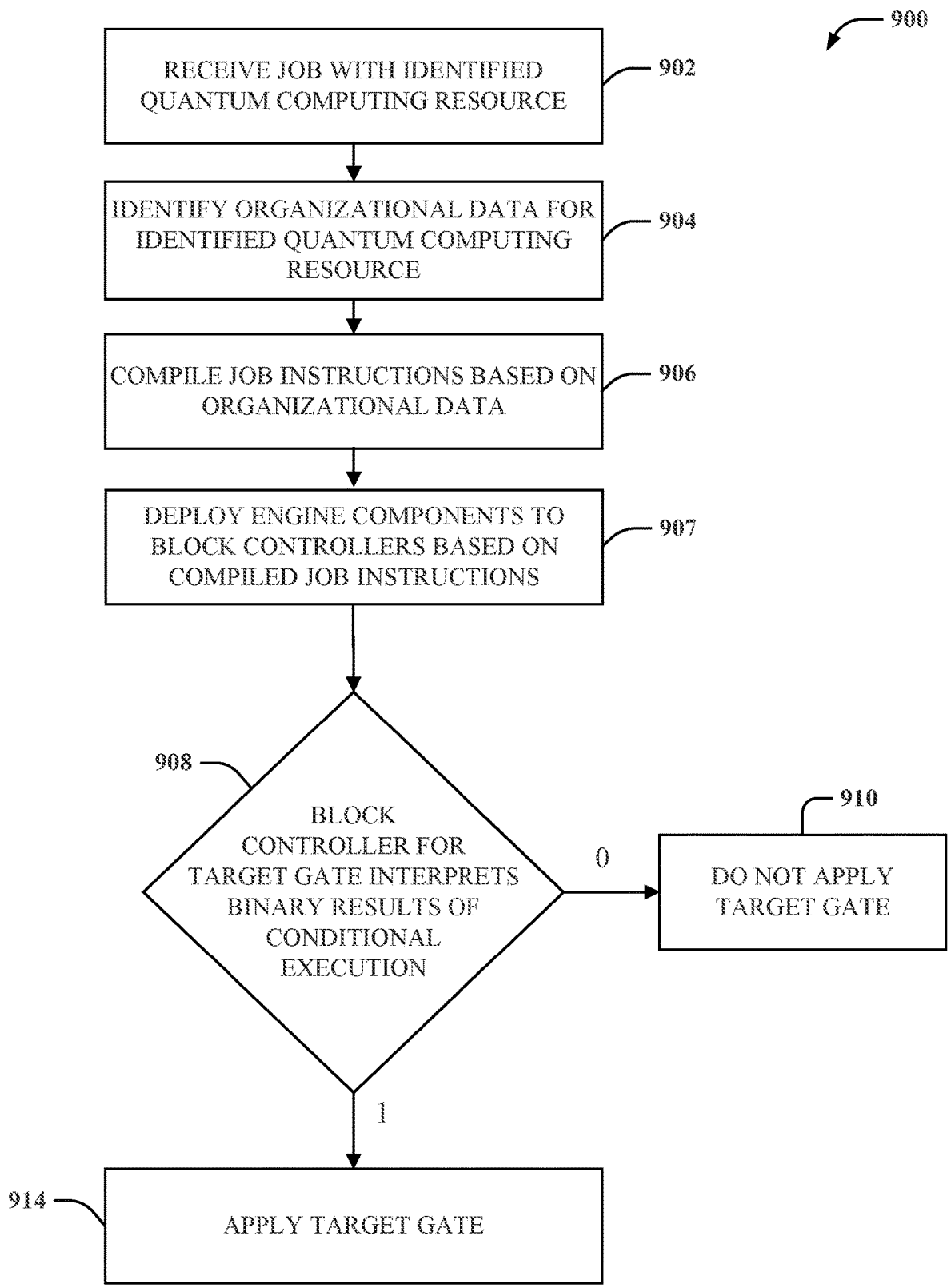
FIG. 9 illustrates a block diagram of an example, non-limiting system that can facilitate mapping conditional execution logic to quantum computing resources, in accordance with one or more embodiments described herein.

FIG. 9 illustrates a flow diagram of an example, non-limiting computer-implemented method 900 that can facilitate mapping conditional execution logic to quantum computing resources, in accordance with one or more embodiments described herein. Repetitive description of like elements and processes employed in respective embodiments is omitted for sake of brevity.

At 902, computer-implemented method 900 can comprise receiving a job with an identified quantum computing resource. At 904, organizational data for the quantum computing resource can be identified. At 906, the job instructions can be compiled based on the organizational data. At 907, engine components generated during compiling can be deployed to block controller components at the identified quantum computing resource. At 907, during execution of the deployed, compiled job, a block controller for a target gate can test a result bit received from a measurement of another controller. At 910, when the condition is false, no gate is applied, and in 914, when the condition is true (1), a gate specified by the program logic is applied.

For simplicity of explanation, the computer-implemented methodologies are depicted and described as a series of acts. It is to be understood and appreciated that the subject innovation is not limited by the acts illustrated and by the order of acts, for example acts can occur in various orders and concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 10:
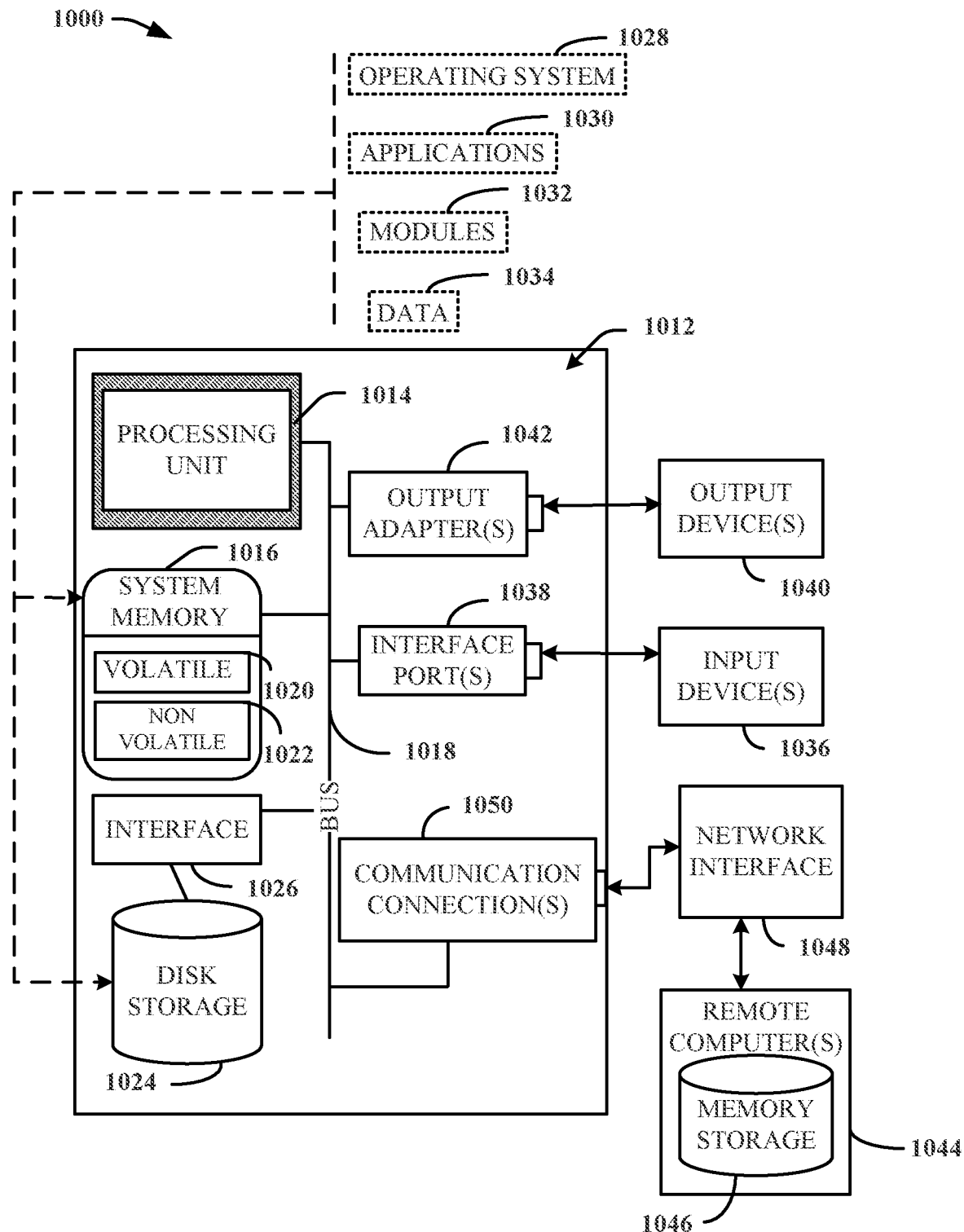
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity.

With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media. To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012.

System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

Figure 11:
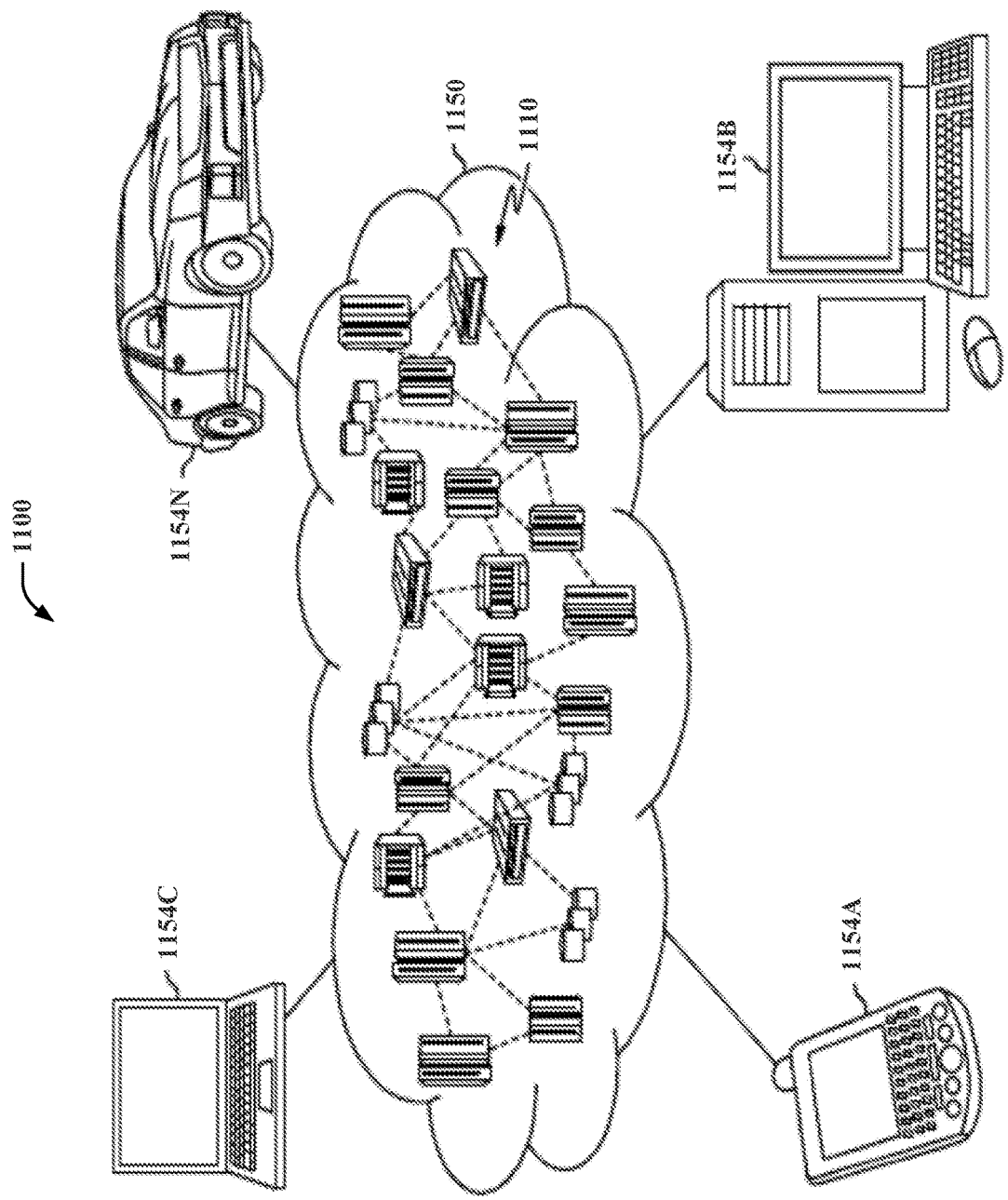
FIG. 11 illustrates a block diagram of an example, non-limiting cloud computing environment in accordance with one or more embodiments of the subject disclosure.

Referring now to FIG. 11, an illustrative cloud computing environment 1150 is depicted. As shown, cloud computing environment 1150 includes one or more cloud computing nodes 1110 with which local computing devices used by cloud consumers, such as, for example, personal digital assistant (PDA) or cellular telephone 1154A, desktop computer 1154B, laptop computer 1154C, and automobile computer system 1154N may communicate. Although not illustrated in FIG. 11, cloud computing nodes 1110 can further comprise a quantum platform (e.g., quantum computer, quantum hardware, quantum software, etc.) with which local computing devices used by cloud consumers can communicate. Nodes 1110 may communicate with one another. They may be grouped (not shown) physically or virtually, in one or more networks, such as Private, Community, Public, or Hybrid clouds as described hereinabove, or a combination thereof. This allows cloud computing environment 1150 to offer infrastructure, platforms and software as services for which a cloud consumer does not need to maintain resources on a local computing device. It is understood that the types of computing devices 1154A-N shown in FIG. 11 are intended to be illustrative only and that computing nodes 1110 and cloud computing environment 1150 can communicate with any type of computerized device over any type of network and network addressable connection (e.g., using a web browser).

Figure 12:
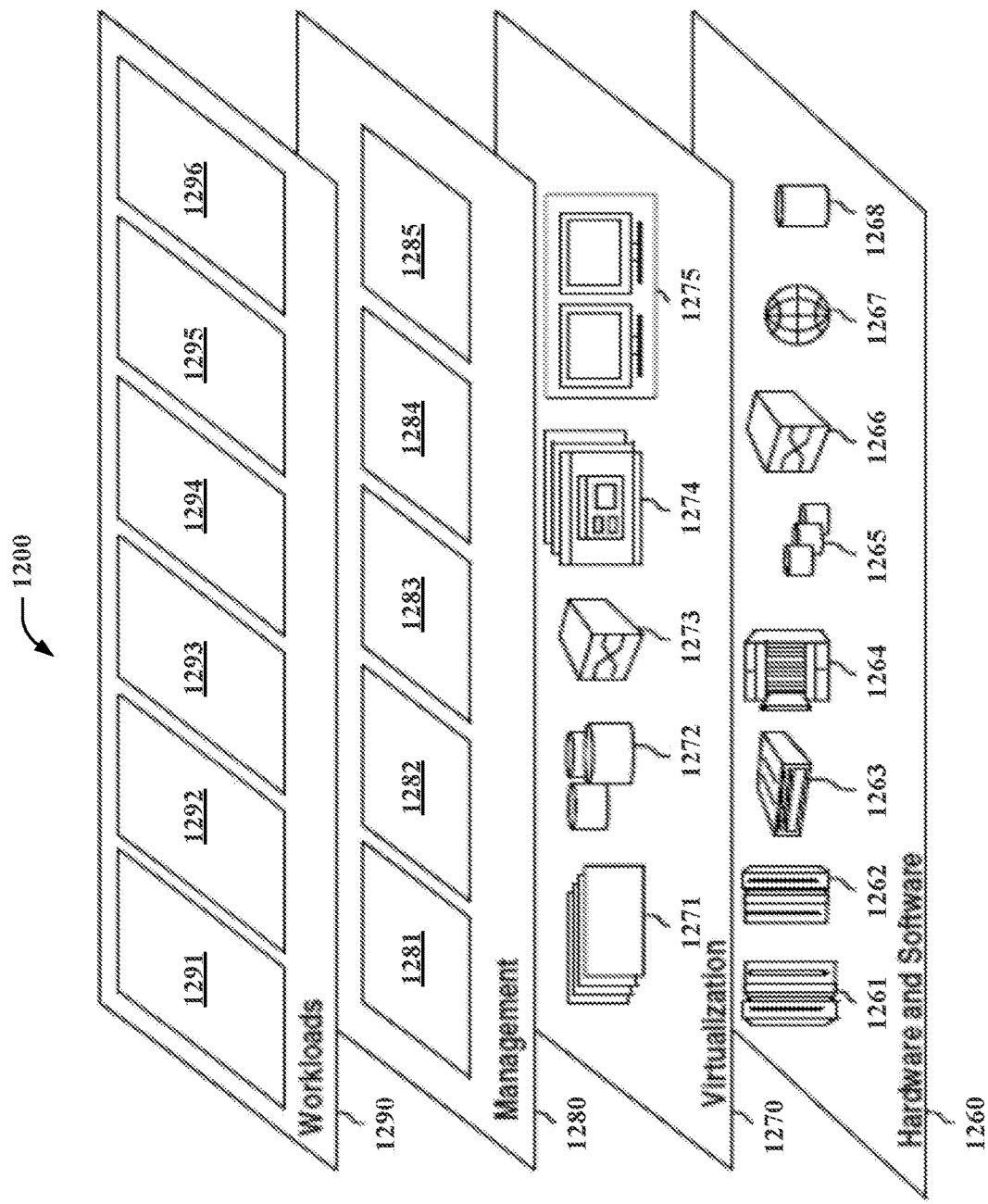
FIG. 12 illustrates a block diagram of example, non-limiting abstraction model layers in accordance with one or more embodiments of the subject disclosure.

Referring now to FIG. 12, a set of functional abstraction layers provided by cloud computing environment 1150 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 1260 includes hardware and software components. Examples of hardware components include: mainframes 1261; RISC (Reduced Instruction Set Computer) architecture based servers 1262; servers 1263; blade servers 1264; storage devices 1265; and networks and networking components 1266. In some embodiments, software components include network application server software 1267, database software 1268, quantum platform routing software (not illustrated in FIG. 12), and quantum software (not illustrated in FIG. 12).

Virtualization layer 1270 provides an abstraction layer from which the following examples of virtual entities may be provided: virtual servers 1271; virtual storage 1272; virtual networks 1273, including virtual private networks; virtual applications and operating systems 1274; and virtual clients 1275.

In one example, management layer 1280 may provide the functions described below. Resource provisioning 1281 provides dynamic procurement of computing resources and other resources that are utilized to perform tasks within the cloud computing environment. Metering and Pricing 1282 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1283 provides access to the cloud computing environment for consumers and system administrators. Service level management 1284 provides cloud computing resource allocation and management such that required service levels are met. Service Level Agreement (SLA) planning and fulfillment 1285 provide pre-arrangement for, and procurement of, cloud computing resources for which a future requirement is anticipated in accordance with an SLA.

Workloads layer 1290 provides examples of functionality for which the cloud computing environment may be utilized. Non-limiting examples of workloads and functions which may be provided from this layer include: mapping and navigation 1291; software development and lifecycle management 1292; virtual classroom education delivery 1293; data analytics processing 1294; transaction processing 1295; and quantum state measurement logic software 1296.

The present invention may be a system, a method, an apparatus and a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and a wireless network. The network can comprise copper transmission cables, optical transmission fibers, wireless transmission, routers, firewalls, switches, gateway computers and edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and block diagrams of methods, apparatus (systems), and computer program products according to embodiments of the invention. It will be understood that each block of the flowchart illustrations and block diagrams, and combinations of blocks in the flowchart illustrations and block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and block diagram block or blocks. These computer readable program instructions can also be stored in a computer readable storage medium that can direct a computer, a programmable data processing apparatus, and other devices to function in a particular manner, such that the computer readable storage medium having instructions stored therein comprises an article of manufacture including instructions which implement aspects of the function/act specified in the flowchart and block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and flowchart illustration, and combinations of blocks in the block diagrams and flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and computers, those skilled in the art will recognize that this disclosure also can or can be implemented in combination with other program modules. Generally, program modules include routines, programs, components, data structures, etc. that perform particular tasks and implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

As used in this application, the terms "component," "system," "platform," "interface," and the like, can refer to and can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and a computer. By way of illustration, both an application running on a server and the server can be a component. One or more components can reside within a process and thread of execution and a component can be localized on one computer and distributed between two or more computers. In another example, respective components can execute from various computer readable media having various data structures stored thereon. The components can communicate via local and remote processes such as in accordance with a signal having one or more data packets (e.g., data from one component interacting with another component in a local system, distributed system, and across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and "exemplary" are utilized to mean serving as an example, instance, or illustration. For the avoidance of doubt, the subject matter disclosed herein is not limited by such examples. In addition, any aspect or design described herein as an "example" and "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable components; and
a processor that executes the computer executable components stored in the memory, wherein the computer executable components comprise:
a compiler component that maps a logical reference to a quantum bit data structure in an instruction, to a first engine component, and
a deployment component that deploys the first engine component to a first block controller component operatively connected to a first quantum computing resource to control the first quantum computing resource based on the instruction,
wherein the compiler component is a single version compiler component that compiles a job for different ones of quantum computing resources thereby avoiding a need for customization of compiled instructions and facilitates use of a same job on multiple quantum machines thereby reducing customization needed to customize the job for different quantum machines, and thereby improving standardization of deployments to different quantum machines reducing computation cost,
wherein the block controller component comprises one or more engine components, one or more digital to analog converters or one or more analog to digital converters, and
wherein, based on the instruction, the deployment component further deploys a second engine component to a second block controller component operatively connected to a second quantum bit of the first quantum computing resource and the first block controller component, wherein the second engine component controls the first quantum computing resource based on the second quantum bit, the first engine component, and the instruction.

2. The system of claim 1, wherein the first block controller component is operatively connected to a first quantum bit of the first quantum computing resource, and wherein the first engine component controls the first quantum computing resource further based on the first quantum bit.

3. The system of claim 2, wherein the first engine component is operatively linked to the first quantum bit via a quantum bit controller coupled to the first quantum bit, wherein the quantum bit controller interfaces with the first quantum bit by sending analog signals to, and receiving analog signals from, the first quantum bit.

4. The system of claim 2, wherein the first engine component further conditionally controls the first quantum computing resource based on a value of the first quantum bit.

5. The system of claim 4, wherein the compiler component further maps the logical reference of the instruction to a second engine component operatively coupled to a second block controller component of a second quantum computing resource, and wherein the first quantum computing resource and the second quantum computing resource have different structures.

6. The system of claim 5, wherein the compiler component selects the second engine component based on second organization data for the second quantum computing resource, wherein the second organization data comprises a structure of engine components of the second quantum computing resource.

7. The system of claim 1, wherein, based on first organization data, the compiler component: further maps execution of the instruction to the first engine component and the second engine component; and configures the first engine component to access a first element of the first quantum computing resource, wherein the first organization data comprises first organization data describing the first element of the first quantum computing resource.

8. The system of claim 7, wherein the instruction further comprises an additional logical reference to a register that stores a result of measuring a first quantum bit, and wherein the first element comprises the register.

9. The system of claim 1, wherein the first organization data further comprises a latency value corresponding to a duration to complete a communication of a program value between the first block controller component and the second block controller component, and wherein, based on the latency value, the deployment component deploys the second engine component to the second block controller component and the first engine component of the second quantum computing resource component.

10. The system of claim 1, wherein, based on the first organization data, the first engine component and the second engine component of the first quantum computing resource are operatively linked to each other in a hierarchical structure.

11. The system of claim 1, wherein the deployment component further deploys a second engine component to an execution controller component, wherein without mapping by the compiler component, the second engine component controls the first quantum computing resource to execute a default instruction.

12. A computer-implemented method, comprising:
mapping, by a system operatively coupled to a processor, a logical reference to a quantum bit data structure in an instruction, to a first engine component, deploying, by the system, the first engine component to a first block controller component operatively connected to a first quantum computing resource, wherein the first engine component controls the first quantum computing resource based on the instruction, wherein the compiler component is a single version compiler component that compiles a job for different ones of quantum computing resources thereby avoiding a need for customization of compiled instructions and facilitates use of a same job on multiple quantum machines thereby reducing customization needed to customize the job for different quantum machines, and thereby improving standardization of deployments to different quantum machines reducing computation cost, and wherein the block controller component comprises one or more engine components, one or more digital to analog converters or one or more analog to digital converters, and deploying, by the system, a second engine component to a second block controller component operatively connected to a second quantum bit of the first quantum computing resource and the first block controller component, wherein the second engine component controls the first quantum computing resource based on the second quantum bit, the first engine component, and the instruction.

13. The computer-implemented method of claim 12, further comprising: further mapping, by the system, based on first organization data, execution of the instruction to the first engine component and the second engine component; and configuring, by the system, the first engine component to access a first element of the first quantum computing resource, wherein the first organization data comprises first organization data describing the first element of the first quantum computing resource.

14. The computer-implemented method of claim 13, wherein the instruction further comprises a logical reference to a register that stores a result of measuring a first quantum bit, and wherein the first element comprises the register.

15. The computer-implemented method of claim 13, wherein the first organization data further comprises a latency value corresponding to a duration to complete a communication of a program value between the first block controller component and the second block controller component, and wherein, based on the latency value, the deployment component deploys the second engine component to the second block controller component and the first engine component of the second quantum computing resource component.

16. A computer program product facilitating mapping conditional execution logic to quantum computing resources, the computer program product comprising a computer readable storage medium having program instructions embodied therewith, the program instructions executable by a processor to cause the processor to:

map, by the processor, a logical reference to a quantum bit data structure in an instruction, to a first engine component, and deploy, by the processor, the first engine component to a first block controller component operatively connected to a first quantum computing resource, wherein the first engine component controls the first quantum computing resource based on the instruction, wherein the compiler component is a single version compiler component that compiles a job for different ones of quantum computing resources thereby avoiding a need for customization of compiled instructions and facilitates use of a same job on multiple quantum machines thereby reducing customization needed to customize the job for different quantum machines, and thereby improving standardization of deployments to different quantum machines reducing computation cost, and wherein the block controller component comprises one or more engine components, one or more digital to analog converters or one or more analog to digital converters, and deploying, by the processor, a second engine component to a second block controller component operatively connected to a second quantum bit of the first quantum computing resource and the first block controller component, wherein the second engine component controls the first quantum computing resource based on the second quantum bit, the first engine component, and the instruction.

17. The computer program product of claim 16, wherein the first block controller component is operatively connected to a first quantum bit of the first quantum computing resource, and wherein the first engine component controls the first quantum computing resource further based on the first quantum bit.

18. The computer program product of claim 17, wherein the first engine component further conditionally controls the first quantum computing resource based on a value of the first quantum bit.

* * * * *